US012576869B2

(12) United States Patent (10) Patent No.: US 12,576,869 B2
Nojiri et al. (45) Date of Patent: Mar. 17, 2026

(54) VEHICLE DISPLAY CONTROL DEVICE, VEHICLE DISPLAY CONTROL SYSTEM, AND VEHICLE DISPLAY CONTROL METHOD

(71) Applicant: DENSO CORPORATION, Kariya-city (JP)

(72) Inventors: Shota Nojiri, Kariya-city (JP); Shuntaro Fukui, Kariya-city (JP); Toshiharu Shiratsuchi, Kariya-city (JP); Shiori Maneyama, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 388 days.

(21) Appl. No.: 18/161,883

(22) Filed: Jan. 30, 2023

(65) Prior Publication Data

US 2023/0166755 A1 Jun. 1, 2023

Related U.S. Application Data

(63) Continuation of application No. PCT/JP2021/028827, filed on Aug. 3, 2021.

(30) Foreign Application Priority Data

Aug. 21, 2020 (JP) ................................. 2020-140155

(51) Int. Cl.
*B60W 50/14* (2020.01)
*B60K 35/10* (2024.01)
(Continued)

(52) U.S. Cl.
CPC ............. *B60W 50/14* (2013.01); *B60K 35/10* (2024.01); *B60K 35/22* (2024.01); *B60K 35/60* (2024.01);
(Continued)

(58) Field of Classification Search
CPC ................. B60W 50/14; B60W 60/00; B60W 2050/146; G06F 3/14; B60K 35/81; B60K 35/10; B60K 35/60; B60K 35/22
(Continued)

(56) References Cited

U.S. PATENT DOCUMENTS 11,072,343 B2 * 7/2021 Emura ................. G05D 1/0257
11,119,479 B2 * 9/2021 Honda ..................... G08G 1/09
(Continued)

FOREIGN PATENT DOCUMENTS

JP 2005324661 A 11/2005
JP 2018024349 A 2/2018
(Continued)

*Primary Examiner* — Luis A Martinez Borrero
(74) *Attorney, Agent, or Firm* — Harness, Dickey & Pierce, P.L.C.

(57) ABSTRACT

A vehicle is configured to perform automated driving in which a vehicle-side system is capable of performing all driving tasks. A condition identification unit is configured to identify whether a condition for performing the automated driving is satisfied. A display control unit is configured to cause a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result of the condition identification unit.

25 Claims, 13 Drawing Sheets

(51) Int. Cl.

| | |
|---|---|
| *B60K 35/22* | (2024.01) |
| *B60K 35/60* | (2024.01) |
| *B60K 35/81* | (2024.01) |
| *B60W 60/00* | (2020.01) |
| *G06F 3/14* | (2006.01) |

(52) U.S. Cl.
CPC ............ *B60K 35/81* (2024.01); *B60W 60/00* (2020.02); *G06F 3/14* (2013.01); *B60W 2050/146* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 11,718,175 | B2 * | 8/2023 | Ha | B60K 35/223 |
| | | | | 701/36 |
| 12,233,715 | B2 * | 2/2025 | Ha | B60K 35/10 |
| 2016/0311323 | A1 * | 10/2016 | Lee | B60K 35/28 |
| 2017/0197637 | A1 * | 7/2017 | Yamada | B60W 50/14 |
| 2018/0015828 | A1 * | 1/2018 | Mcnew | B60W 50/14 |
| 2018/0093676 | A1 * | 4/2018 | Emura | G08G 1/0962 |
| 2018/0345790 | A1 * | 12/2018 | Mimura | B60K 35/22 |
| 2018/0345988 | A1 * | 12/2018 | Mimura | B60W 50/082 |
| 2018/0345991 | A1 * | 12/2018 | Mimura | B60W 50/14 |
| 2018/0348756 | A1 * | 12/2018 | Mimura | G05D 1/0061 |
| 2018/0348757 | A1 * | 12/2018 | Mimura | G05D 1/0061 |
| 2018/0348758 | A1 * | 12/2018 | Nakamura | B60W 50/14 |
| 2019/0039618 | A1 | 2/2019 | Mori | |
| 2019/0168772 | A1 * | 6/2019 | Emura | B60K 35/50 |
| 2019/0179331 | A1 * | 6/2019 | Heo | B60K 35/29 |
| 2019/0344790 | A1 * | 11/2019 | Kitagawa | G08G 1/16 |
| 2020/0010095 | A1 * | 1/2020 | Kim | B60W 30/02 |
| 2020/0062276 | A1 | 2/2020 | Yuan et al. | |
| 2020/0156662 | A1 * | 5/2020 | Mimura | B60K 35/22 |
| 2020/0172122 | A1 * | 6/2020 | Mimura | B60W 60/0051 |
| 2020/0172123 | A1 * | 6/2020 | Kubota | B60W 60/0053 |
| 2020/0255034 | A1 * | 8/2020 | Taguchi | G06V 20/58 |
| 2020/0339147 | A1 | 10/2020 | Hayakawa et al. | |
| 2020/0410264 | A1 * | 12/2020 | Ahn | H04N 21/2387 |
| 2021/0016663 | A1 * | 1/2021 | Ha | B60K 35/55 |
| 2021/0056934 | A1 * | 2/2021 | Horihata | G06F 3/147 |
| 2021/0146943 | A1 * | 5/2021 | Oniwa | B60R 21/00 |
| 2021/0146954 | A1 * | 5/2021 | Kaji | B60W 30/143 |
| 2021/0146962 | A1 * | 5/2021 | Kaji | B60W 30/17 |
| 2022/0058998 | A1 * | 2/2022 | Yagyu | G09G 3/002 |
| 2023/0302906 | A1 * | 9/2023 | Ha | B60K 35/29 |

FOREIGN PATENT DOCUMENTS

| | | |
|---|---|---|
| JP | 2018185641 A | 11/2018 |
| JP | 2019084855 A | 6/2019 |
| JP | 2019119248 A | 7/2019 |
| WO | WO-2017154396 A1 | 9/2017 |

* cited by examiner

VEHICLE DISPLAY CONTROL DEVICE, VEHICLE DISPLAY CONTROL SYSTEM, AND VEHICLE DISPLAY CONTROL METHOD

CROSS REFERENCE TO RELATED APPLICATION

The present application is a continuation application of International Patent Application No. PCT/JP2021/028827 filed on Aug. 3, 2021, which designated the U.S. and claims the benefit of priority from Japanese Patent Application No. 2020-140155 filed on Aug. 21, 2020. The entire disclosures of all of the above applications are incorporated herein by reference.

TECHNICAL FIELD

The present disclosure relates to a vehicle display control device, a vehicle display control system, and a vehicle display control method.

BACKGROUND

Conventionally, a known vehicle capable of an automated driving is configured to switch between a manual driving and the automated driving.

SUMMARY

According to an aspect of the present disclosure, a vehicle display control device is to be used in a vehicle. The vehicle is configured to perform automated driving in which a vehicle-side system is capable of performing all driving tasks or a part of driving tasks.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
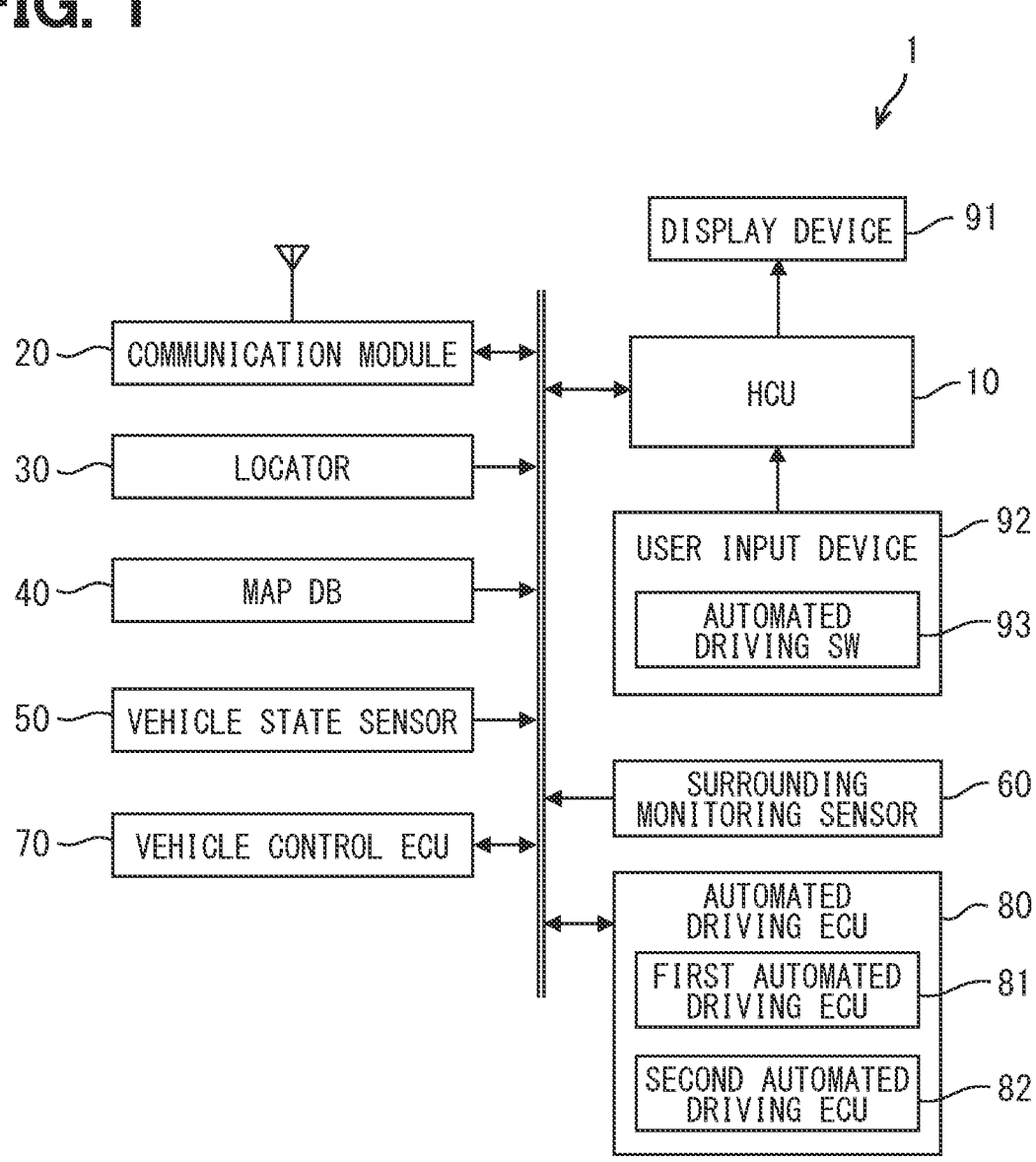
FIG. 1 is a diagram showing an example of a schematic configuration of a vehicle system.

Hereinafter, examples of the present disclosure will be described.

According to an example of the present disclosure, a vehicle, which is capable of an automated driving, is configured to switch between a manual driving and the automated driving.

The vehicle starts an operation of an autonomous drive function by detecting a switch operation to the automated driving by a driver in an area where the automated driving can be performed.

In order to enable the automated driving, there should be various requirements with respect to the subject vehicle and its surroundings. Therefore, even when the subject vehicle is located in an area in which the automated driving is possible, there may be cases where the subject vehicle is capable of the automated driving and cases where the automated driving is not possible. Therefore, it is considered effective to present information to the driver such that the driver is facilitated to easily understand whether or not the subject vehicle is capable of performing the automated driving.

According to an example of the present disclosure, a vehicle display control device is to be used in a vehicle. The vehicle is configured to perform automated driving in which a vehicle-side system is capable of performing all driving tasks. The vehicle display control device comprises; a condition identification unit configured to identify whether a condition for performing the automated driving is satisfied; and a display control unit configured to cause a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result of the condition identification unit.

According to an example of the present disclosure, a vehicle display control method is for a vehicle and to be executed by at least one processor. The vehicle is configured to perform automated driving in which a vehicle-side system is capable of performing all driving tasks. The vehicle display control method comprises: identifying, in a condition identification process, whether a condition for performing the automated driving is satisfied; and causing, in a display control process, a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result of the condition identification process.

The above configuration enables, according to whether the subject vehicle satisfies the condition for performing the automated driving, to cause the display device, which is to be used in the interior of the subject vehicle, to display the condition presentation image that is at least one of the image, which indicates that the subject vehicle satisfies the condition for performing the automated driving, or an image, which indicates that the subject vehicle does not satisfy the condition for performing the automated driving, according to an identification result of the condition identification unit. Therefore, by looking at the condition presentation image displayed on the display, the driver is capable of easily recognizing whether or not the subject vehicle satisfies the condition for performing the automated driving. Consequently, this configuration enables to present information to the driver such that the driver is facilitated to easily understand whether or not the subject vehicle is capable of performing the automated driving.

According to an example of the present disclosure, the vehicle display control device is to be used in a vehicle. The vehicle is configured to perform automated driving in which a vehicle-side system performs at least a part of driving tasks. The vehicle display control device comprises: a condition identification unit configured to identify whether a condition for performing the automated driving is satisfied for each of conditions classified into a plurality of types; and a display control unit configured to cause a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result of the condition identification unit for each of conditions classified into a plurality of types.

According to an example of the present disclosure, a vehicle display control method for a vehicle to be executed by at least one processor, the vehicle configured to perform automated driving in which a vehicle-side system is configured to perform at least a part of driving tasks, the vehicle display control device comprising: identifying, in a condition identification process, whether a condition for performing the automated driving is satisfied for each of conditions classified into a plurality of types; and causing, in a display control process, a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, for each of the conditions classified into the plurality of types, according to an identification result of the condition identification unit.

The above configuration enables, according to the identification result of whether or not the subject vehicle satisfies the condition for performing the automated driving identified for each of the conditions classified into multiple types, to cause the display device, which is to be used in the interior of the subject vehicle, to display the condition presentation image that is at least one of the image, which indicates that the subject vehicle satisfies the condition for performing the automated driving, or an image, which indicates that the subject vehicle does not satisfy the condition for performing the automated driving, according to an identification result of the condition identification unit. Therefore, by looking at the condition presentation image displayed on the display, the driver is capable of easily recognizing whether or not the subject vehicle satisfies the condition for performing the automated driving. In addition, the condition presentation image is displayed for each of the conditions classified into multiple types. Therefore, it becomes easier for the driver to recognize why the automated driving can be performed and why the automated driving cannot be performed. Consequently, this configuration enables to present information to the driver such that the driver is facilitated to easily understand whether or not the subject vehicle is capable of performing the automated driving.

According to an example of the present disclosure, a vehicle display control system comprises: the display device, which is to be used in the interior of the vehicle, and the vehicle display control device.

This configuration includes the vehicle display control device. Therefore, this configuration enables to present information to the driver such that the driver is facilitated to easily understand whether or not the subject vehicle is capable of performing the automated driving.

Multiple embodiments will be described for disclosure hereinafter with reference to the drawings. For convenience of description, the same reference signs are assigned to portions having the same functions as those illustrated in the drawings used in the description so far among the plurality of embodiments, and a description of the same portions may be omitted. Description in another applicable embodiment may be referred to for such a portion denoted by the identical reference sign.

(First Embodiment)

<Schematic Configuration of Vehicle System 1>

The following will describe a first embodiment of the present disclosure with reference to the accompanying drawings. A vehicle system 1 shown in FIG. 1 is used for a vehicle configured to perform an automated driving (hereinafter referred to as an automated driving vehicle). As shown in FIG. 1, the vehicle system 1 includes an HCU (Human Machine Interface Control Unit) 10, a communication module 20, a locator 30, a map database (hereinafter referred to as map DB) 40, a vehicle state sensor 50, a surrounding monitoring sensor 60, a vehicle control ECU 70, an automated driving ECU 80, a display device 91, and a user input device 92. The vehicle system 1 corresponds to a vehicle display control system. Although the vehicle using the vehicle system 1 is not necessarily limited to an automobile, hereinafter, an example using the automobile will be described.

The degree of the automated driving (hereinafter, referred to as an automation level) of an automated driving vehicle includes multiple levels as defined by, for example, SAE. This automation level is classified into, for example, five levels including level 0 to level 5 as follows.

Level 0 is a level where the driver performs all driving tasks without any intervention of the system of the vehicle. The driving task may be rephrased as a dynamic driving task. The driving tasks include, for example, steering, acceleration and deceleration, and surrounding monitoring. The level 0 corresponds to so-called manual driving. Level 1 is a level where the system assists steering or acceleration and deceleration. The levels 1 corresponds to so-called driving assistance. The level 2 is a level where the system assists steering and acceleration and deceleration. The level 2 corresponds to so-called partial driving automation. The levels 1 and 2 are a part of the automated driving.

For example, the automated driving at levels 1 and 2 is automated driving in which a driver has a duty of monitoring related to safe driving (hereinafter simply referred to as a duty of monitoring). The duty of monitoring includes visual monitoring of surroundings. The automated driving at levels 1 and 2 is, in other words, automated driving in which a second task is not permitted. The second task is an action other than a driving operation permitted to the driver, and is a predetermined specific action. The second task is, in other words, a secondary activity, another activity, or the like. The second task must not prevent a driver from responding to a request to takeover the driving from the automated driving system. As an example, viewing of a content such as a video, operation of a smartphone, reading, and eating are assumed as the second task.

The level 3 is a level where the system performs all driving tasks in a certain location, such as a highway, and the driver performs driving in an emergency. In the level 3, the driver must be able to respond quickly when the system requests to takeover the driving. The level 3 corresponds to a conditional automated driving. The level 4 is a level where the system is capable of performing all driving tasks, except under a specific circumstance, such as an unsupported road, an extreme environment, and the like. The level 4 corresponds to a highly automated driving. The level 5 is a level where the system is capable of performing all driving tasks in any states. The level 5 corresponds to a fully automated driving.

For example, the automated driving at levels 3 to 5 is an automated driving in which the driver does not have the duty of monitoring. The automated driving at levels 3 to 5 is, in other words, automated driving in which the second task is permitted. In the present embodiment, switching between the automation level at level 3 or higher and the automation level at level 2 or lower switches the presence or absence of the duty of monitoring. In the present embodiment, a case in which takeover of driving to the driver is required when the automation level at level 3 or higher is switched to the automation level at level 2 or lower will be described as an example.

The automated driving vehicle of the present embodiment is capable of switching the automation level. A configuration may be employable in which the automation level is switchable within a part of the levels 0 to 5. In the present embodiment, an example will be described in which an automated vehicle is capable of switching between the automated driving at the automation level 3 or higher, the automated driving at the automation level 2 or lower, or manual driving.

The communication module 20 transmits and receives information to and from other vehicles via wireless communications. In other words, the communication module 20 performs vehicle-to-vehicle communications. The communication module 20 may transmit and receive information via wireless communications with a roadside device installed on a roadside. In other words, the communication module 20 may perform road-to-vehicle communications. When performing the road-to-vehicle communications, the communication module 20 may receive information about a surrounding vehicle transmitted from the surrounding vehicle via the roadside device. Further, the communication module 20 may transmit and receive information to and from a center outside the subject vehicle via wireless communications. In other words, the communication module 20 may perform wide area communications. When performing the wide area communications, the communication module 20 may receive information about a surrounding vehicle transmitted from the surrounding vehicle via the center. In addition, when performing the wide area communications, the communication module 20 may receive traffic congestion information, weather information, and the like around the subject vehicle from the center.

The locator 30 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 30 combines the positioning signals received by the GNSS receiver with a measurement result of the inertial sensor to sequentially detect the position of the subject vehicle (hereinafter, subject vehicle position) of the subject vehicle on which the locator 30 is mounted and a travelling direction. The subject vehicle position may be represented by, for example, coordinates of latitude and longitude. The subject vehicle position may be measured by using a travel distance acquired from signals sequentially output from a vehicle speed sensor mounted on the vehicle.

The map DB 40 is a non-volatile memory and stores the high-precision map data. The high-precision map data is map data with higher precision than the map data used for route guidance in a navigation function. The map DB 40 may also store map data used for route guidance. The high-precision map data includes information that can be used for the automated driving, such as three-dimensional road shape information, information on the number of lanes, and information indicating the direction of travel allowed for each lane. In addition, the high-definition map data may also include a node point information indicating the positions of both ends of a road marking such as a lane marking. Note that the locator 30 may be configured without the GNSS receiver by using the three-dimensional shape information of the road. For example, the locator 30 may be configured to identify the subject vehicle position by using the three-dimensional shape information of the road and a LiDAR (Light Detection and Ranging/Laser Imaging Detection and Ranging) that detects feature points of the road shape and the building or the surrounding monitoring sensor 60 such as a surrounding monitoring camera. The three-dimensional shape information of the road may be generated based on a captured image by REM (Road Experience Management).

The communication module 20 may receive map data distributed from an external server through, for example, wide area communications and may store the data in the map DB 40. In this case, the map DB 40 may be a volatile memory, and the communication module 20 may sequentially acquire the map data of an area corresponding to the subject vehicle position.

The vehicle state sensor 50 is a sensor group for detecting various states of the subject vehicle. The vehicle state sensor 50 includes a vehicle speed sensor for detecting a vehicle speed, a steering sensor for detecting a steering angle, a grip sensor for detecting gripping of a steering wheel, and the like. The vehicle state sensor 50 outputs detected sensing information to the in-vehicle LAN. Note that the sensing information detected by the vehicle state sensor 50 may be output to an in-vehicle LAN via an ECU mounted on the subject vehicle.

The surrounding monitoring sensor 60 monitors a surrounding environment of the subject vehicle. For example, the surrounding monitoring sensor 60 detects an obstacle around the subject vehicle, such as a pedestrian, a moving object like another vehicle, and a stationary object, such as an object on the road. The surrounding monitoring sensor 60 further detects a road surface marking such as a traffic lane marking around the subject vehicle. The surrounding monitoring sensor 60 is a sensor such as a surrounding monitoring camera that captures a predetermined range around the subject vehicle, a millimeter wave radar that transmits a search wave in a predetermined range around the subject vehicle, a sonar, or a LiDAR. The surrounding monitoring camera sequentially outputs, as sensing information, sequentially captured images to the automated driving ECU 80. A sensor that transmits a probe wave such as a sonar, a millimeter wave radar, a LiDAR or the like sequentially outputs, as the sensing information to the automated driving ECU 80, a scanning result based on a received signal acquired as a wave reflected on an obstacle on the road. The sensing information detected by the surrounding monitoring sensor 60 may be outputted to the in-vehicle LAN via the automated driving ECU 80.

The vehicle control ECU 70 is an electronic control device configured to perform a traveling control of the subject vehicle. The traveling control includes an acceleration and deceleration control and/or a steering control. The vehicle control ECU 70 includes a steering ECU that performs the steering control, a power unit control ECU and a brake ECU that perform the acceleration and deceleration control, and the like. The vehicle control ECU 70 is configured to output a control signal to a traveling control device such as an electronic throttle, a brake actuator, and an EPS (Electric Power Steering) motor mounted on the subject vehicle thereby to perform the traveling control.

The automated driving ECU 80 includes, for example, a processor, a memory, an I/O, and a bus that connects those devices, and executes a control program stored in the memory thereby to execute a process related to the automated driving. The memory referred to here is a non-transitory tangible storage medium, and stores programs and data that can be read by a computer. The non-transitory tangible storage medium is a semiconductor memory, a magnetic disk, or the like.

The automated driving ECU 80 includes a first automated driving ECU 81 and a second automated driving ECU 82. The following description is given assuming that each of the first automated driving ECU 81 and the second automated driving ECU 82 includes a processor, a memory, an I/O, and a bus connecting these devices. A configuration may be employable in which a common processor bears the function of the first automated driving ECU81 and the second automated driving ECU82 by a virtualization technology.

The first automated driving ECU 81 bears the function of the automated driving at level 2 or lower as described above. In other words, the first automated driving ECU 81 enables the automated driving that requires the duty of monitoring. For example, the first automated driving ECU 81 is capable of executing at least one of a longitudinal direction control in a longitudinal direction and a lateral direction control in a lateral direction of the subject vehicle. The longitudinal direction is a direction that coincides with a longitudinal direction of the subject vehicle. The lateral direction is a direction that coincides with a lateral direction of the subject vehicle. The first automated driving ECU 81 executes, as the longitudinal direction control, the acceleration and deceleration control of the subject vehicle. The first automated driving ECU 81 executes, as the lateral direction control, the steering control of the subject vehicle. The first automated driving ECU 81 includes, as functional blocks, a first environment recognition unit, an ACC control unit, an LTA control unit, and the like.

The first environment recognition unit recognizes a driving environment around the subject vehicle based on the sensing information acquired from the surrounding monitoring sensor 60 and information about a surrounding vehicle around the subject vehicle received by the communication module 20. As an example, the first environment recognition unit recognizes, for example, a detailed position of the subject vehicle in a driving lane (hereinafter, subject vehicle lane) from information such as left and right lane markings of the subject vehicle lane in which the subject vehicle travels. In addition, the first environment recognition unit may recognize a position of a surrounding vehicle relative to the subject vehicle, a traveling direction of a surrounding vehicle, a relative speed of a surrounding vehicle to the subject vehicle, a speed of a surrounding vehicle, and the like. The traveling direction of a surrounding vehicle may be recognized, for example, from a time-series change in a position of a surrounding vehicle with respect to the subject vehicle. The speed of a surrounding vehicle may be recognized from, for example, a speed of the subject vehicle and a relative speed of a surrounding vehicle. When a speed of a surrounding vehicle can be received by the communication module 20 as the information of the surrounding vehicle, the speed of the surrounding vehicle may be recognized from the received information.

The ACC control unit executes an ACC control (Adaptive Cruise Control) to perform constant-speed traveling of the subject vehicle at a target speed or following travel with respect to the preceding vehicle. The ACC control unit may perform ACC control using the position and the velocity of the vehicle around the subject vehicle recognized by the first environment recognition unit. The ACC control unit may cause the vehicle control ECU 70 to perform the acceleration and deceleration control thereby to perform the ACC control. An LTA control unit executes an LTA (Lane Tracing Assist) control to maintain the subject vehicle to drive within the lane. The LTA control unit may perform the LTA control using the detailed position of the subject vehicle in the driving lane recognized by the first environment recognition unit. The LTA control unit may cause the vehicle control ECU 70 to perform the steering control thereby to perform the LTA control. Note that the ACC control is an example of the longitudinal direction control. The LTA control is an example of the lateral direction control.

The first automated driving ECU 81 performs both the ACC control and the LTA control thereby to realize the automated driving at level 2. The first automated driving ECU 81 may perform either the ACC control or the LTA control thereby to realize the automated driving at level 1.

On the other hand, the second automated driving ECU 82 bears the function of the automated driving at level 3 or higher. In other words, the second automated driving ECU 82 enables the automated driving that does not require the duty of monitoring. The second automated driving ECU 82 includes, as functional blocks, a second environment recognition unit, an action determination unit, a trajectory generation unit, and the like.

The environment recognition unit recognizes the driving environment around the subject vehicle based on the sensing information, which is acquired from the surrounding monitoring sensor 60, the subject vehicle position, which is acquired from the locator 30, the map data, which is acquired from the map DB 40, information, which acquired by the communication module 20, and the like. As an example, the second environment recognition unit uses these pieces of information to generate a virtual space that reproduces an actual driving environment. The second environment recognition unit may be configured to use a recognition result of the first environment recognition unit.

The second environment recognition unit determines a manual driving area (hereinafter referred to as an MD area) in a travelling area of the subject vehicle. The second environment recognition unit determines an automated driving area (hereinafter referred to as an AD area) in the travelling area of the subject vehicle. The second environment recognition unit determines an ST section in the AD area. The second environment recognition unit determines a non-ST section in the AD area.

The MD area is an area where the automated driving is prohibited. In other words, the MD area is an area where the driver performs all of the longitudinal control, the lateral control and the surrounding monitoring of the subject vehicle. For example, the MD area may be an ordinary road.

The AD area is an area where the automated driving is permitted. In other words, the AD area is an area where the subject vehicle is capable of performing at least one of the longitudinal control, the lateral control, and the surrounding monitoring, instead of the driver. For example, the AD area may be a highway or a motorway.

The AD area is classified into a non-ST section, in which the automated driving at level 2 or lower is permitted, and an ST section, in which the automated driving at level 3 or higher is permitted. In the present embodiment, the non-ST section, in which the automated driving at level 1 is permitted, and the non-ST section, in which the automated driving at level 2 is permitted, are not classified. The non-ST section may be a section other than the ST section.

The action determination unit determines an action, which is scheduled for the subject vehicle (hereinafter referred to as a future action), based on a recognition result of the driving environment by the second environment recognition unit. The action determination unit determines a future action for causing the subject vehicle to perform the automated driving. The action determination unit may determine, as the future action, a type of action that the subject vehicle should take in order to arrive at a destination. This type includes, for example, going straight, turning right, turning left, and changing lanes.

Further, when the action determination unit determines that it is necessary to transfer a driving control right to the driver (i. e. , takeover of the driving), the action determination unit generates a takeover request of driving and provides the takeover request to the HCU 10. An example of a case where it is necessary to transfer the driving control right to the driver is when the subject vehicle moves from the AD area to the MD area. Another example is when it is predicted that a condition for performing the automated driving at level 3 or higher (hereinafter referred to as an automated driving condition) will not be satisfied in the automated driving at level 3 or higher, or when the automated driving condition is no longer satisfied.

In addition, the action determination unit determines whether or not the automated driving at level 3 or higher can be performed. The action determination unit may determine whether or not the automated driving at level 3 or higher can be performed based on whether or not the automated driving condition is satisfied. In the present embodiment, as an example of the automated driving at level 3 or higher, a case where the automated driving at level 3 is performed will be described below. In this embodiment, the following four conditions will be described as examples of the condition for the automated driving.

The first condition may be whether a structure (hereinafter referred to as a separation structure) that separates lanes according to the direction of travel exists. The separation structure includes a median strip, a pole, and the like. This first condition is referred to as a separation structure condition. The reason why the automated driving at level 3 is possible is that the separation structure exists is because the recognition accuracy of the driving environment may be lowered when the separation structure does not exist. The separation structure condition may be a condition not only for performing the automated driving at level 3, but also a condition for performing the automated driving at level 4 or higher, or a condition for performing the automated driving at level 2. The action determination unit may determine whether or not the separation structure condition is satisfied, for example, by image recognition of a captured image of a surrounding monitoring camera.

The second condition may be whether the vehicle speed of the subject vehicle is equal to or lower than a vehicle speed threshold at which the automated driving at level 3 can be performed. This second condition is referred to as a vehicle speed condition. The reason why the vehicle speed is set as a condition for performing the automated driving at level 3 is that when the vehicle speed becomes too high, there is a risk that the vehicle-side system alone may not be able to monitor the surroundings sufficiently. The vehicle speed condition may be set for the respective automation level. The vehicle speed condition may be the same for multiple automation levels. For example, a vehicle speed threshold at which the automated driving at level 3 can be performed may be set to be lower than a vehicle speed threshold at which the automated driving at level 2 can be performed. The action determination unit may determine whether or not the vehicle speed condition is satisfied, for example, based on a sensing result of a vehicle speed sensor of the vehicle state sensors 50.

The third condition may be whether the road on which the subject vehicle travels has a number of lanes that allows the automated driving at level 3 to be performed. As an example of the third condition, the road on which the subject vehicle travels has multiple lanes on one side. This third condition is referred to as a lane number condition. The reason why the number of lanes is set as a condition for performing the automated driving at level 3 is that the accuracy of recognizing the driving environment may decrease when multiple lanes on one side do not exist. The lane number condition is not only a condition for performing the automated driving at level 3, but may be a condition for performing the automated driving at level 2. For example, the condition for the number of lanes for the level 2 may be one or more lanes on each side. The action determination unit may determine whether or not the lane number condition is satisfied, for example, by image recognition of the image captured by the surrounding monitoring camera.

The fourth condition is whether a state of another vehicle in the vicinity of the subject vehicle allows the automated driving at level 3. As an example, the surroundings of the subject vehicle are congested may be the state of another vehicle in the vicinity of the subject vehicle in which the automated driving at level 3 can be performed. This fourth condition is referred to as another vehicle state condition. The reason why the automated driving at level 3 can be performed is the other vehicle condition is because the automated driving at level 3 is possible only in a specific place. The other vehicle condition is not only a condition for performing the automated driving at level 3, but may be a condition for performing the automated driving at level 2. The action determination unit may determine whether or not the other vehicle condition is satisfied, for example, based on a recognition result of the driving environment recognized by the second environment recognition unit. For example, when the other vehicle condition is the traffic congestion, it can be determined whether or not there is a traffic congestion based on the number of surrounding vehicles and a surrounding vehicle at a low speed. Whether or not there is a traffic congestion may be determined from traffic congestion information received from the center by the communication module 20.

In this embodiment, the above four conditions will be described as examples, but the conditions are not necessarily limited to the examples. The automated driving condition may be a part of the above four conditions. Further, the conditions other than the above four conditions may be included. For example, existence of a high-precision map may be set as the automated driving condition. In addition, the automated driving condition may be that the weather is not bad weather. The bad weather referred to here may be heavy rain, thick fog, heavy snow, or the like. Alternatively, the automated driving condition may be that the driver is not in a state in which the driver is impossible to takeover the driving. The state in which the takeover of the driving is impossible may be that the driver is in a state of sleep, unconsciousness, or the like. The state of the driver may be identified by image recognition of the captured image of the camera that captures the driver. As an example, a DSM (Driver Status Monitor) or the like may be used.

The trajectory generation unit generates the travel trajectory of the subject vehicle in a section, in which the automated driving can be performed, based on the recognition result of the driving environment by the second environment recognition unit and the future action determined by the action determination unit. The travel trajectory includes, for example, a target position of the subject vehicle according to a progress, a target speed at each target position, and the like. The trajectory generation unit sequentially provides the generated travel trajectory, as a control command to be followed by the subject vehicle in the automated driving, to the vehicle control ECU 70.

With the automated driving system including the automated driving ECU 80, the automated driving at level 2 or lower and the automated driving at level 3 or higher can be performed in the subject vehicle. The automated driving ECU 80 may be configured to switch the automation level of the automated driving of the subject vehicle as necessary. As an example, the manual driving may be switched to the automated driving at Level 2 or lower, when the subject vehicle moves from the MD area to the non-ST section in the AD area. The manual driving may be switched to the automated driving at Level 3, when the subject vehicle moves from the MD area to the ST section in the AD area. The automated driving at Level 2 or lower may be switched to the automated driving at Level 3, when the subject vehicle moves from the non-ST section to the ST section in the AD area. The automated driving at Level 3 may be switched to the automated driving at Level 2 or lower, when the subject vehicle moves from the ST section to the non-ST section in the AD area. The automated driving at level 3 may be switched to the manual driving when the subject vehicle moves from the ST section in the AD area to the MD area. The automated driving at level 2 or lower may be switched to the manual driving when the subject vehicle moves from the non-ST section in the AD area to the MD area.

The automated driving ECU 80 may be configured to perform switching to raise the automation level when requested by the driver. On the other hand, the automated driving ECU 80 may be configured to perform switching to lower the automation level, for example, when the driver responds to a request from the system of the vehicle. For example, the automated driving ECU 80 may be configured to generate a driving takeover request and provide the driving takeover request to the HCU 10 when switching from the automated driving at level 3 or higher to the automated driving at level 2 or lower or the manual driving. Then, when the automated driving ECU 80 determines that the driver has responded to this driving takeover request, takeover of the driving may be performed.

The display device 91 is a display device provided to the subject vehicle. The display device 91 is provided so that a display surface is oriented to an interior of the subject vehicle. For example, the display device 91 is provided so that the display surface is positioned in front of the driver seat of the subject vehicle. As the display device 91, various displays, such as a liquid crystal display, an organic EL display, and a head-up display (hereinafter referred to as an HUD), may be used.

The user input device 92 accepts input from the user. The user input device 92 may be an operation device that receives an operation input from the user. The operation device may be a mechanical switch or a touch switch integrated with the display device. It should be noted that the user input device 92 is not limited to the operation device that accepts the operation input, as long as the user input device 92 is a device that accepts input from the user. For example, the user input device 92 may be a voice input device that receives command input by voice from the user.

The user input device 92 includes an automated driving switch (hereinafter, an automated driving SW) 93. The automated driving SW 93 is a switch for the user to transmit an intention of switching the automation level of the subject vehicle to the system of the vehicle. Herein, a case where the automated driving SW 93 is used for the user to transmit the intention to switch the automation level of the subject vehicle to the system of the vehicle is described as an example. However, a configuration using a voice input device or the like other than the switch may be used. Therefore, the user input device 92 and the automated driving SW 93 correspond to an input receiving unit.

The HCU 10 is mainly composed of a computer including a processor, a volatile memory, a nonvolatile memory, an I/O, and a bus connecting these devices. The HCU 10 is connected to the display device 91 and the in-vehicle LAN. The HCU 10 executes a control program stored in the nonvolatile memory, thereby to control indication of the display device 91. The HCU 10 corresponds to a vehicle display control device. The configuration of the HCU 10 for controlling indication of the display device 91 will be described in detail below.

<Schematic Configuration of HCU 10>

Figure 2:
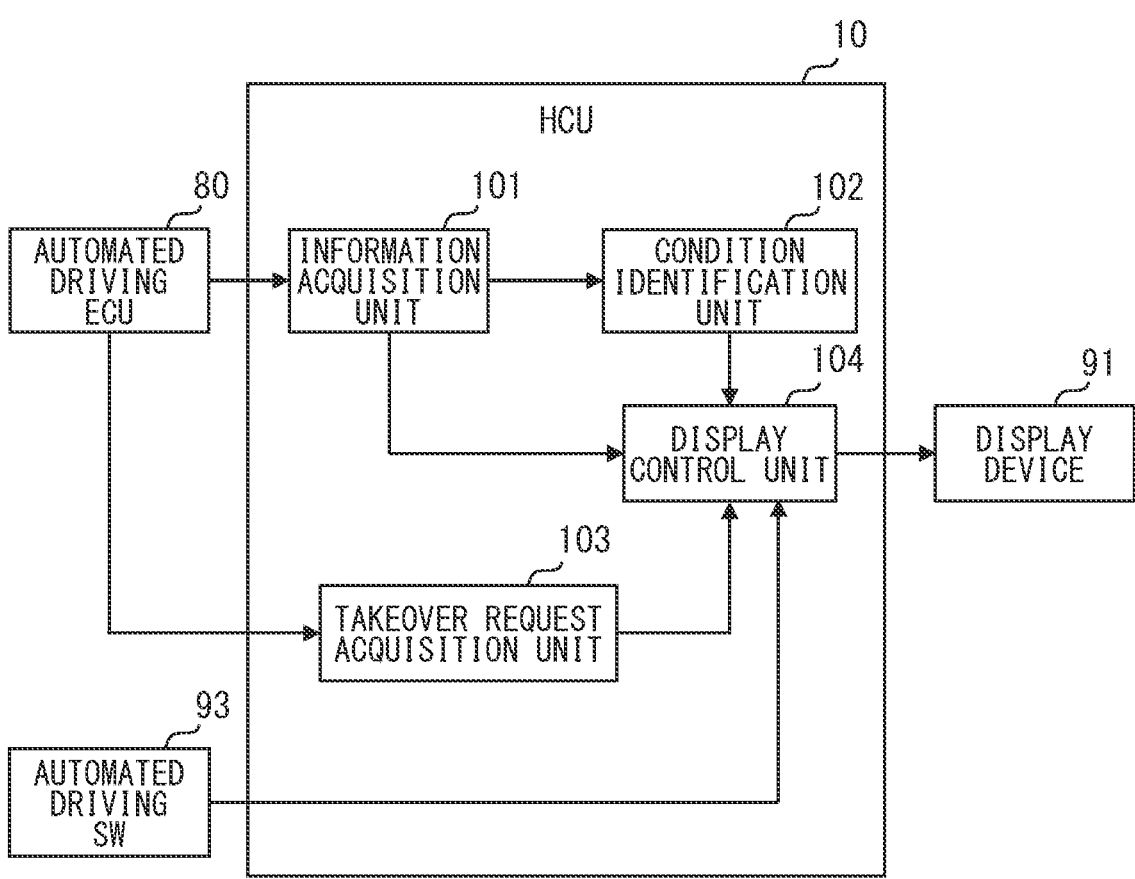
FIG. 2 is a diagram showing an example of a configuration of an HCU.

Herein, a schematic configuration of the HCU 10 will be described with reference to FIG. 2. As shown in FIG. 2, the HCU 10 includes, as functional blocks, an information acquisition unit 101, a condition identification unit 102, a takeover request acquisition unit 103, and a display control unit 104. Execution of a process of each functional block of the HCU 10 by the computer corresponds to execution of a vehicle display control method. Some or all of the functions executed by the HCU 10 may be produced by hardware using one or more ICs or the like. Alternatively, some or all of the functions executed by the HCU 10 may be implemented by a combination of execution of software by a processor and a hardware device.

The information acquisition unit 101 acquires information input from the outside of the HCU 10. The information acquisition unit 101, for example, sequentially acquires a recognition result of a driving environment recognized by the automated driving ECU80. In addition, the information acquisition unit 101 sequentially acquires a determination result of whether or not the automated driving at level 3 can be performed, which is determined by, for example, the automated driving ECU 80. The determination result may include information of whether or not each of multiple types of the automated driving conditions is satisfied. In the example of the present embodiment, the information may be information of whether or not the separation structure condition is satisfied, whether or not the vehicle speed condition is satisfied, whether or not the lane number condition is satisfied, and whether or not the other vehicle condition is satisfied.

The condition identification unit 102 identifies whether or not the automated driving condition is satisfied. The processing in this condition identification unit 102 corresponds to a condition identification process. The condition identification unit identifies whether or not the automated driving condition is satisfied for each of the conditions classified into multiple types. As an example, identification is made whether each of the separation structure condition, the vehicle speed condition, the number of lanes condition, and the other vehicle condition is satisfied.

The takeover request acquisition unit 103 acquires the driving takeover request output from the automated driving ECU 80. The takeover request acquisition unit 103 acquires the driving takeover request when the automated driving ECU 80 outputs the driving takeover request.

The display control unit 104 controls display on the display device 91. Processing by the display control unit 104 corresponds to a display control process. The display control unit 104 causes the display device 91 to display an image showing a foreground of the vehicle (hereinafter referred to as a foreground image). The display control unit 104 may display the foreground image on the display device 91 using the recognition result of the driving environment acquired by the information acquisition unit 101. For example, the foreground image may be a bird's-eye view viewed from a virtual viewpoint above the subject vehicle.

Figure 3:
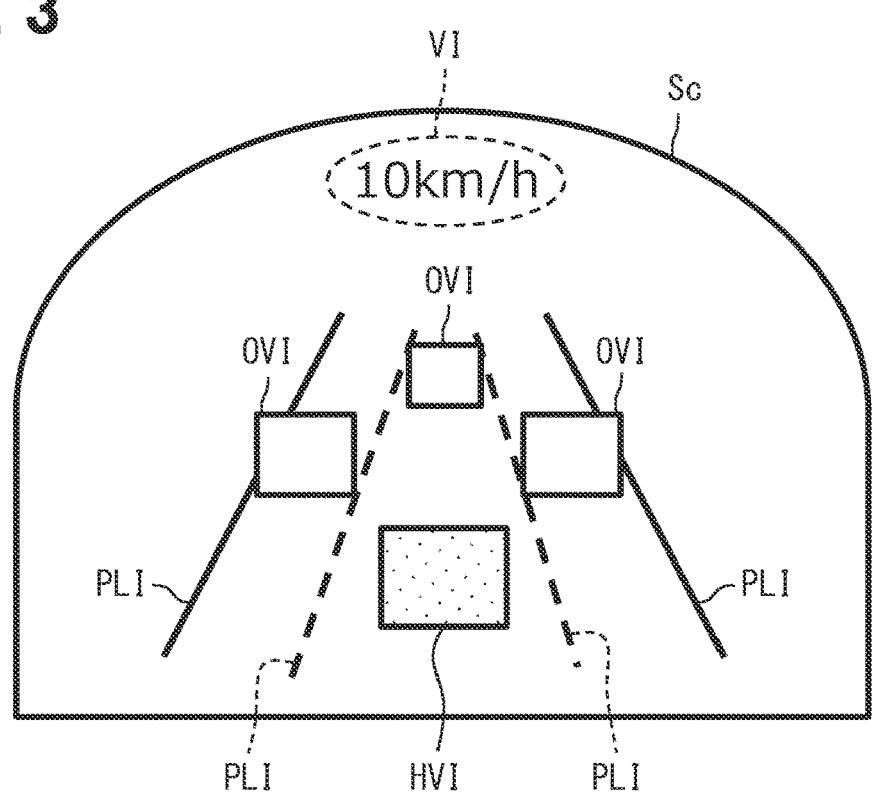
FIG. 3 is a diagram for explaining an example of display of a foreground image.
Figure 4:
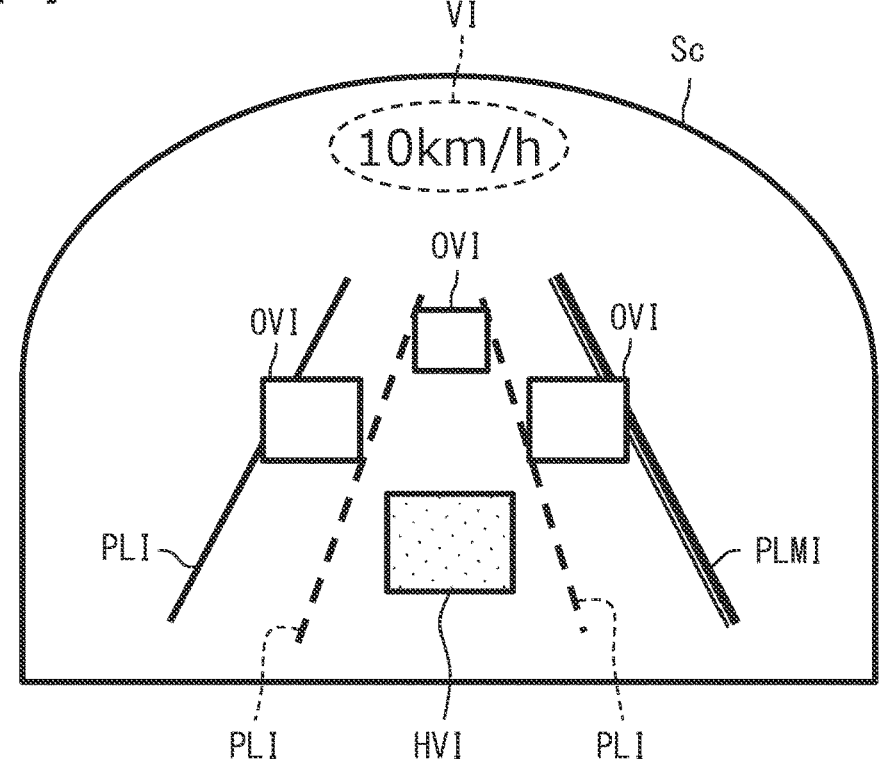
FIG. 4 is a diagram for explaining an example of display of a condition presentation image.

An example of a foreground image will be described with reference to FIG. 3. Sc in FIG. 3 shows a display screen of the display device 91. HVI in FIG. 3 shows an image representing the subject vehicle (hereinafter referred to as the subject vehicle image). OVI in FIG. 3 shows an image representing a surrounding vehicle of the subject vehicle (hereinafter referred to as a surrounding vehicle image). PLI in FIG. 3 shows an image representing a lane marking (lane marking image). VI in FIG. 3 shows an image representing a vehicle speed of the subject vehicle (hereinafter referred to as a subject vehicle speed image). As the foreground image, as shown in FIG. 3, a subject vehicle image, a surrounding vehicle image, the lane marking image, and a subject vehicle speed image may be displayed. In the foreground image, the subject vehicle image and the surrounding vehicle image that simulate an actual positional relationship between the subject vehicle and the surrounding vehicle may be displayed.

In addition, the display control unit 104 causes the display device 91 to display a condition presentation image that is an image indicating that the subject vehicle satisfies the automated driving condition or an image indicating that the subject vehicle does not satisfy the automated driving condition, according to the identification result of the condition identification unit 102. The display control unit 104 may display, as the condition presentation image, a change in display of a portion of the foreground image that corresponds to the automated driving condition.

An example of the condition presentation image will now be described with reference to FIGS. 4 to 9. When the separation structure condition is satisfied, as shown in PLMI in FIG. 4, the shape of the lane marking image in which the separation structure exists may be changed from a default display. For example, a line type of the lane marking image in which the separation structure exists may be changed. Alternatively, the color of the lane marking image in which the separation structure exists may be changed. For example, the default color may be black, and the color may be changed to a calming color such as blue. In addition, the resolution of the lane marking image in which the separation structure exists may be changed to be higher than its default.

Figure 5:
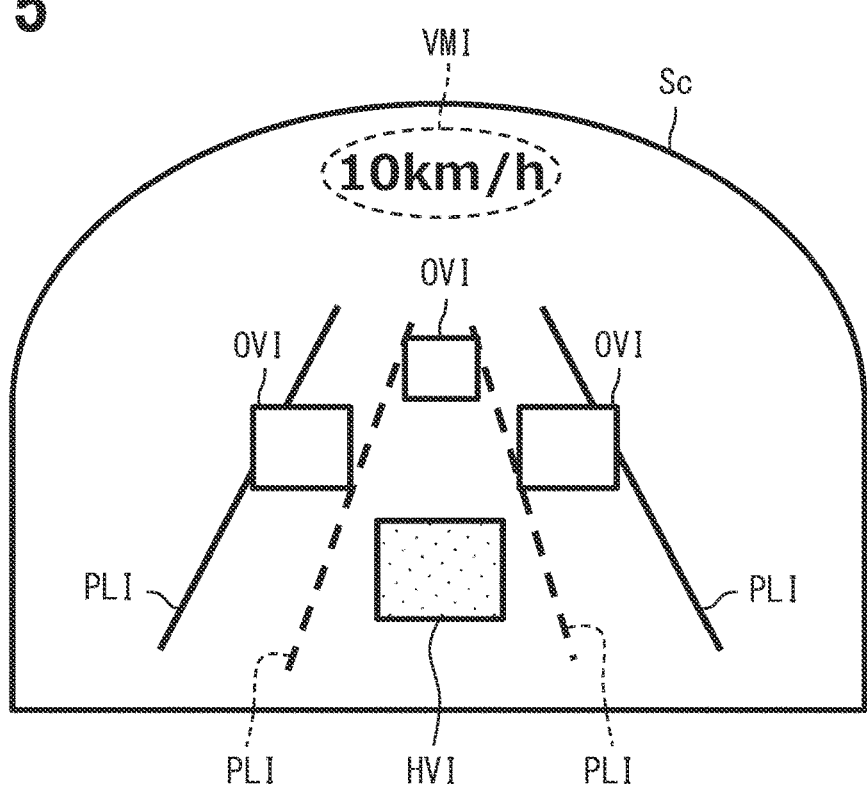
FIG. 5 is a diagram for explaining an example of display of a condition presentation image.
Figure 6:
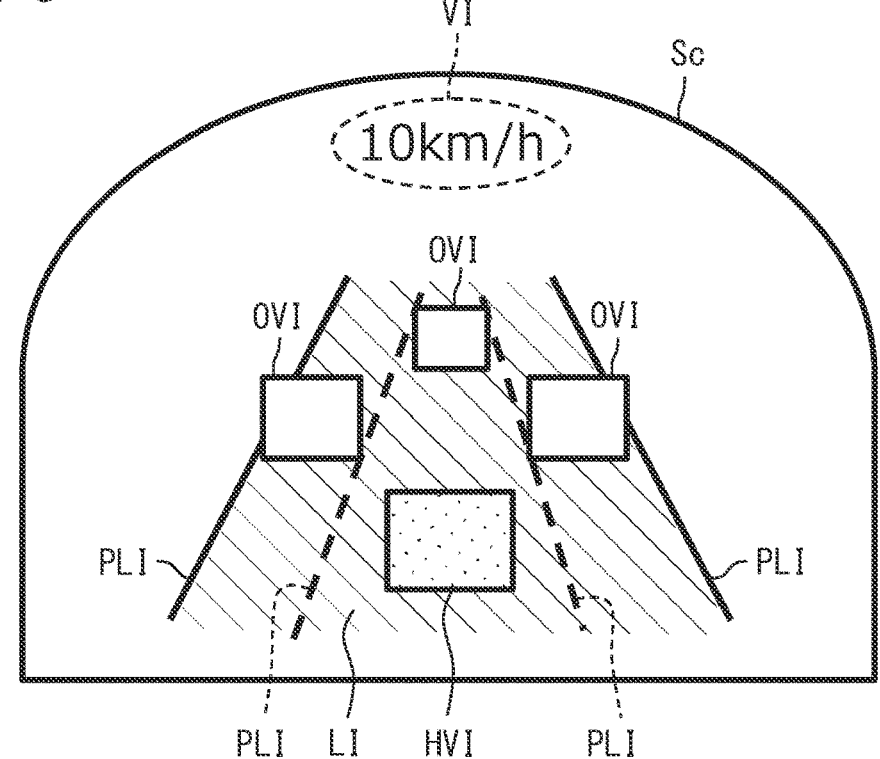
FIG. 6 is a diagram for explaining an example of display of a condition presentation image.
Figure 7:
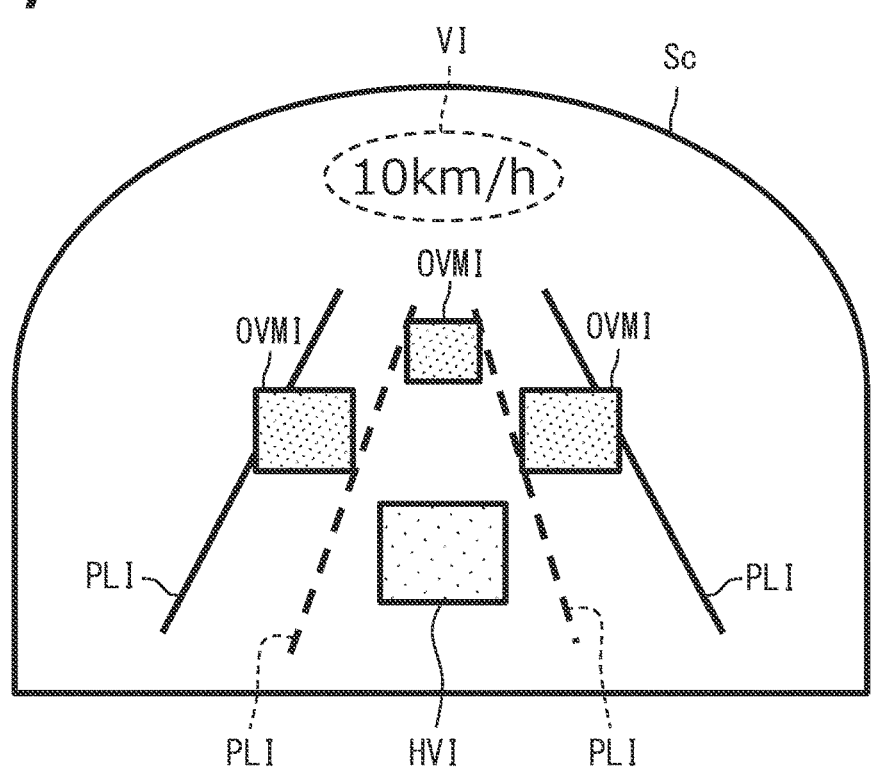
FIG. 7 is a diagram for explaining an example of display of a condition presentation image.
Figure 8:
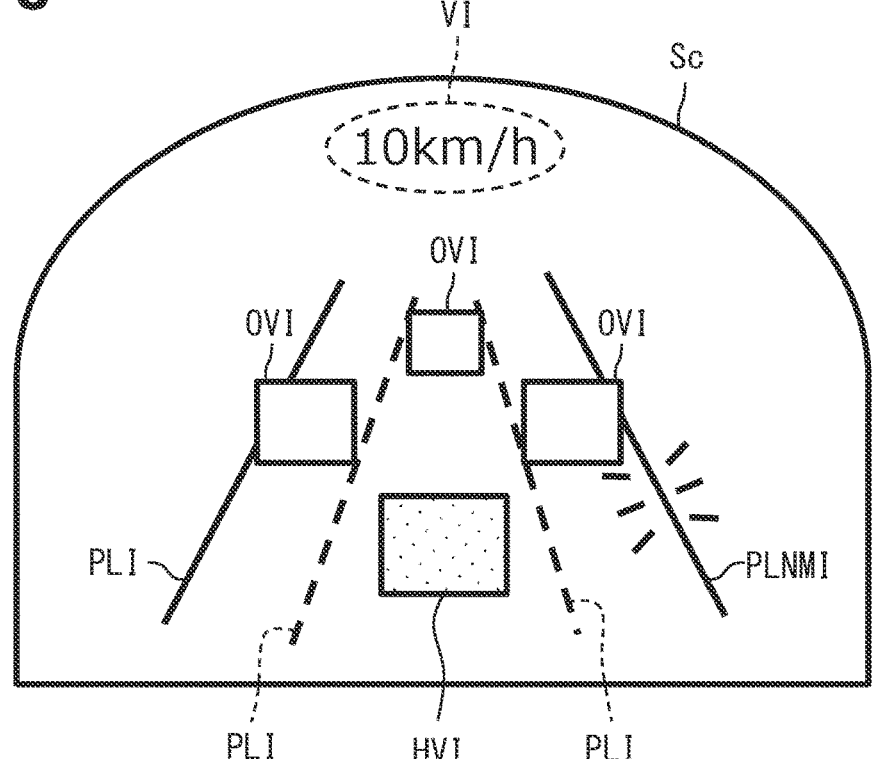
FIG. 8 is a diagram for explaining an example of display of a condition presentation image.

When the vehicle speed condition is satisfied, the vehicle speed image may be highlighted as shown in VMI in FIG. 5. Alternatively, the color of the subject vehicle speed image may be changed. For example, the default color may be black, and the color may be changed to a calming color such as blue. In addition, the resolution of the subject vehicle speed image may be changed to be higher than its default. When the lane number condition is satisfied, as indicated by LMI in FIG. 6, an image showing all lanes (hereinafter referred to as lane image LI) may be highlighted. For example, the color of the lane image LI may be changed. For example, with respect to the default color, the color may be changed to a calming color such as blue. When the other vehicle condition is satisfied, the surrounding vehicle image may be highlighted as shown in OVMI in FIG. 7. For example, the color of the surrounding vehicle image may be changed. For example, with respect to the default color, the color may be changed to a calming color such as blue. In addition, the resolution of the surrounding vehicle image may be changed to be higher than its default.

As the condition presentation image, instead of displaying the image indicating that the vehicle satisfies the condition for performing the automated driving at level 3, an image indicating that the vehicle does not satisfy the automated driving conditions may be displayed. For example, when the separation structure condition is not satisfied, as shown in PLNMI in FIG. 8, the lane marking image in which the separation structure exists may be blinked. Alternatively, the color of the lane marking image in which the separation structure exists may be changed. For example, the default color is black, and the color may be changed to an exciting color such as red. Alternatively, the resolution of the marking line image in which the separation structure exists may be changed to be low.

When the vehicle speed condition is not satisfied, the subject vehicle speed image may be flashed. Alternatively, the color of the subject vehicle speed image may be changed. For example, the default color is black, and the color may be changed to an exciting color such as red. In addition, the resolution of the subject vehicle speed image may be changed to be lower than its default. When the lane number condition is not satisfied, the color of the lane image LI may be changed. For example, with respect to the default color, the color may be changed to an exciting color such as red. When the other vehicle condition is not satisfied, the surrounding vehicle image may be blinked. In addition, the color of the surrounding vehicle image may be changed. For example, with respect to the default color, the color may be changed to an exciting color such as red. In addition, the resolution of the surrounding vehicle image may be changed to be lower than its default.

Figure 9:
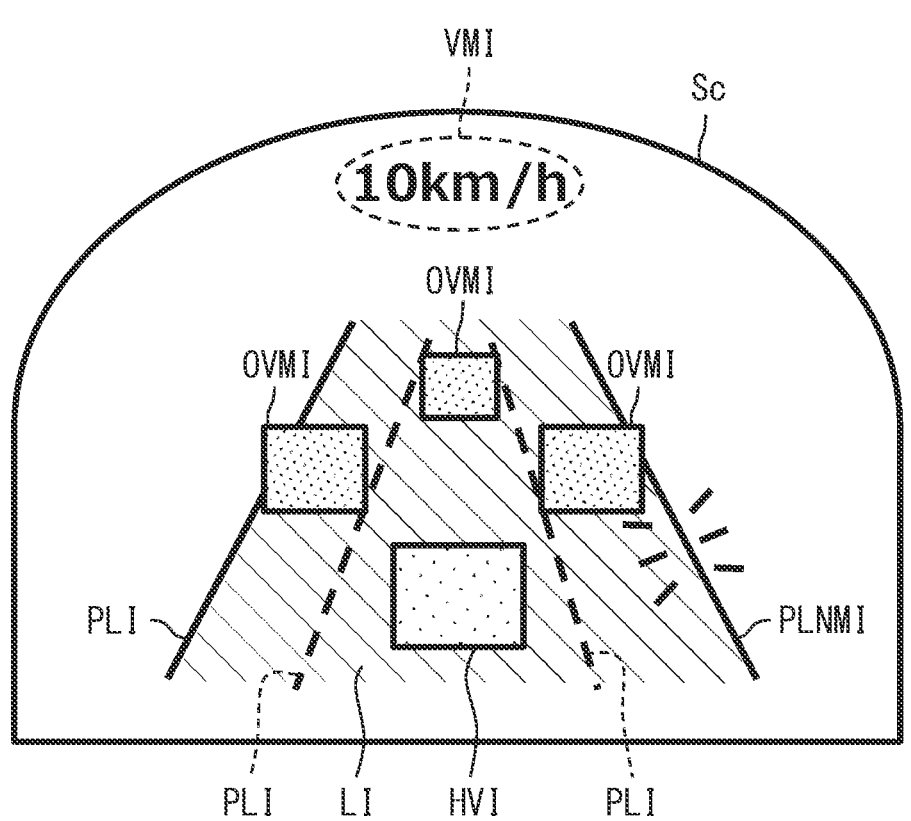
FIG. 9 is a diagram for explaining an example of display of a condition presentation image.

As for the image showing that the vehicle satisfies the automated driving condition and the image showing that the vehicle does not satisfy the automated driving condition, when multiple conditions are satisfied, the display control unit 104 displays the condition presentation image of the multiple conditions. As the condition presentation image, as shown in FIG. 9, an image indicating that the subject vehicle satisfies the automated driving condition and an image indicating that the subject vehicle does not satisfy the automated driving condition may be displayed together. FIG. 9 shows an example showing an image showing that the separation structure condition is not satisfied and an image showing that the vehicle speed condition, the number of lanes condition, and the other vehicle state condition are satisfied that are mixed and displayed.

The display control unit 104 preferably starts display of the condition presentation image in at least one of a state in which the vehicle is not performing the automated driving at level 3 and a state in which the subject vehicle ends the automated driving at level 3. According to this, it is possible to reduce unnecessary display of the condition presentation image in a state where the subject vehicle is able to perform the automated driving at level 3.

The display control unit 104 preferably starts display of the condition presentation image when a specific condition among the automated driving conditions classified into multiple types is satisfied. For example, the specific condition may be the separation structure condition, the vehicle speed condition, the lane number condition, or the other vehicle condition. In an example of this embodiment, the display of the condition presentation image is started when the other vehicle condition that the surroundings of the subject vehicle are congested is satisfied. According to the above configuration, it is possible to display the condition presentation image at the timing when the possibility of performing the automated driving at level 3 increases, without the driver's operation. The specific condition may be multiple automated driving conditions classified into multiple types. In this way, it is possible to display the condition presentation image at the timing when the condition presentation image is estimated to be useful for the driver.

The display control unit 104 may be configured to start the display of the condition presentation image when it is possible to predict a location that satisfies a specific condition among the automated driving conditions classified into multiple types and when the vehicle is within a predetermined distance or within a predetermined time to that location. For example, the specific condition may be the separation structure condition, the vehicle speed condition, the lane number condition, or the other vehicle condition. In the example of the present embodiment, display of the condition presentation image is started when the location that satisfies the other vehicle condition where the surroundings of the vehicle are congested is predicted and when the vehicle is within a predetermined distance or within a predetermined time to that location.

The HCU 10 may predict the location where the other vehicle condition is satisfied (hereinafter referred to as a congestion start point) where the surroundings of the subject vehicle are congested from the congestion information received from the center by the communication module 20. The display control unit 104 may compute, from the subject vehicle position measured by the locator 30, the congestion start point, and the map data stored in the map DB 40, the distance from the subject vehicle to the congestion start point. The display control unit 104 may compute, from an average vehicle speed of the subject vehicle and the distance from the subject vehicle to the congestion start point, a time required to travel from the subject vehicle to the congestion start point. The predetermined distance may be a distance that can be set appropriately. The predetermined time may be a time that can be set appropriately. With the above configuration as well, it is possible to display the condition presentation image prior to a timing at which a possibility of performing the automated driving at level 3 increases, without the driver's operation. In this way, it is possible to display the condition presentation image at the timing when the condition presentation image is estimated to be useful for the driver.

The display control unit 104 may be configured to start the display of the condition presentation image when the user input device 92 receives an input requesting the start of the automated driving. For example, when an input by operating the automated driving SW 93 is received, the display of the condition presentation image may be started. According to this, it is possible to display the condition presentation image at a timing when the driver requests the start the automated driving at level 3. In this way, it is possible to display the condition presentation image at the timing when the condition presentation image is estimated to be useful for the driver.

The display control unit 104 preferably ends the display of the condition presentation image after displaying the condition presentation image and when the subject vehicle performs the automated driving at level 3. This is because a state in which the automated driving at level 3 can be performed is a state in which all the automated driving conditions are satisfied, and necessity of the display of the condition presentation image is low.

<Condition Presentation Image Display Related Processing in HCU 10>

Figure 10:
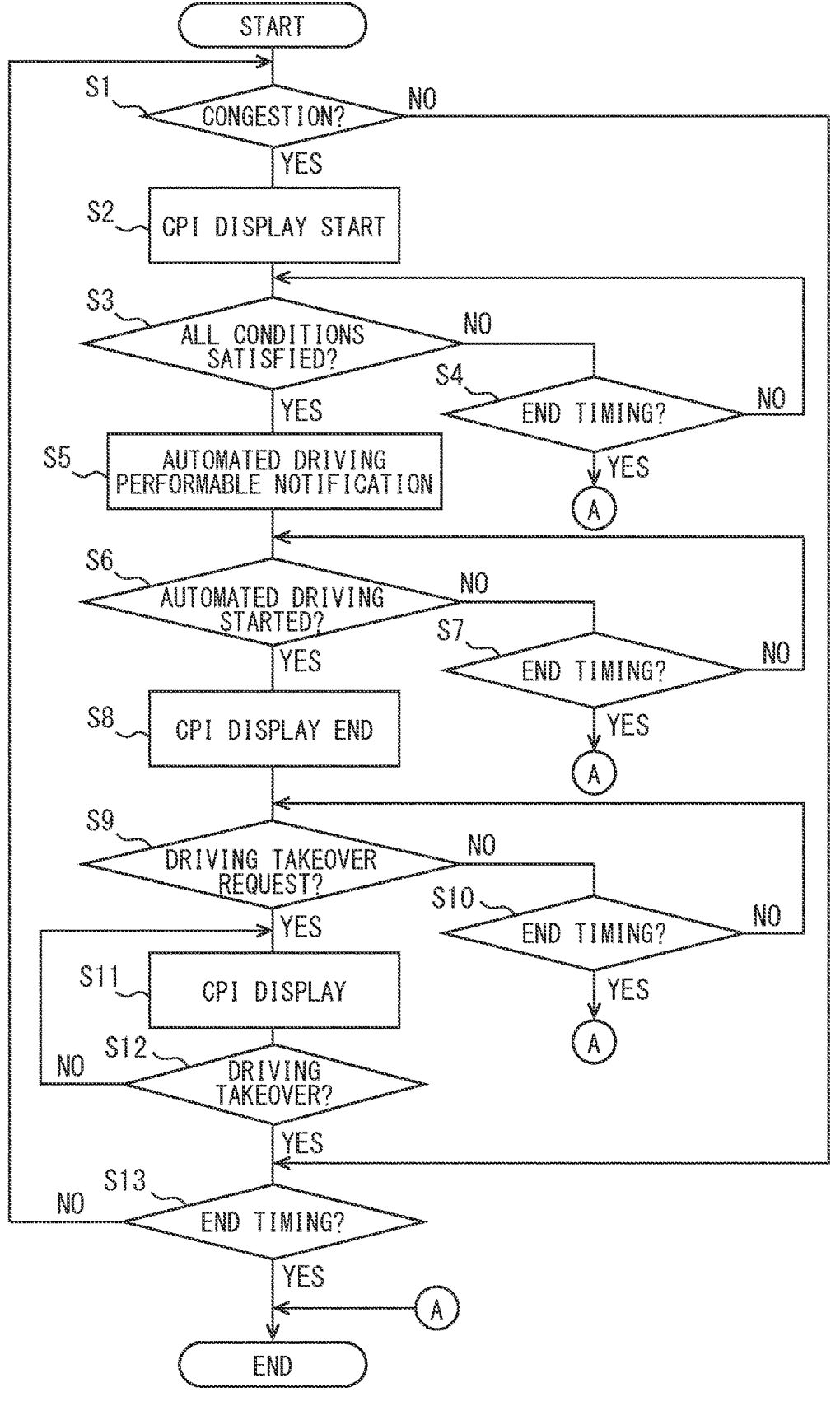
FIG. 10 is a flow chart showing an example of a flow of a condition presentation image display related process in an HCU.
Figure 11:
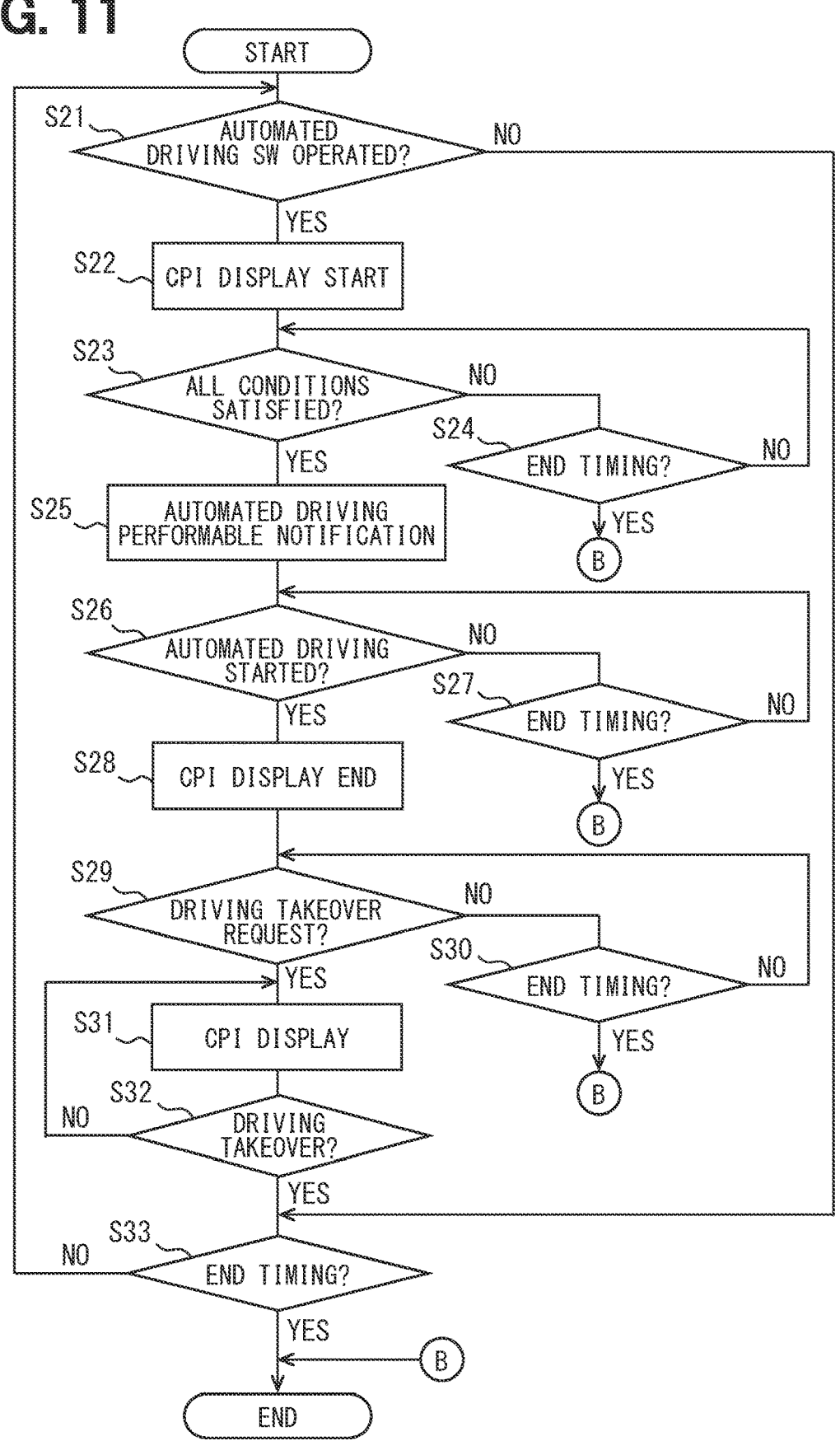
FIG. 11 is a flow chart showing an example of a flow of a condition presentation image display related process in the HCU.

Herein, with reference to the flow charts of FIGS. 10 and 11, an example of a flow of a process related to condition presentation image display in the HCU 10 (hereinafter referred to as condition presentation image display related processing) will be explained. An example of a flow of the condition presentation image display related process when the display of the condition presentation image is started without an operation of the automated driving SW 93 as a trigger will be described below with reference to FIG. 10. On the other hands, an example of a flow of the condition presentation image display related process when the display of the condition presentation image is started on an operation of the automated driving SW 93 as a trigger will be described below with reference to FIG. 11.

The flowchart of FIG. 10 may be configured to start when a switch for starting an internal combustion engine or a motor generator (hereinafter referred to as the power switch) of the subject vehicle is turned on and when the foreground image is displayed In addition, in a configuration that allows switching on and off of a function to display the condition presentation image, the flowchart may be configured to start when the power switch is turned on while the function to display the condition presentation image is turned on. Alternatively, the flowchart may be configured to start when the function to display the condition presentation image is switched from off to on while the power switch is on.

First, in step S1, when the condition identification unit 102 identifies that the vicinity of the subject vehicle is congested, and the other vehicle state condition is satisfied (YES in S1), the process proceeds to step S2. On the other hand, when the condition identification unit 102 does not identify that the surroundings of the subject vehicle are congested, and the other vehicle state condition is not satisfied (NO in S1), the process proceeds to step S13. Herein, as an example, a configuration is shown in which the process is performed depending on whether or not it is identified that the surroundings of the vehicle are congested, and the other vehicle state condition that is satisfied. It is noted that, the configuration is not necessarily limited to this. For example, the process may be performed depending on whether or not the subject vehicle is within a predetermined distance or within a predetermined time to a predicted congestion start point.

In step S2, the display control unit 104 starts display of the condition presentation image on the display device 91. In the drawing, the condition presentation image is abbreviated as CPI. As an example, as the automated driving condition that satisfies the condition, an image indicating that the automated driving conditions are satisfied is displayed. Note that the display control unit 104 may cause the display device 91 to display the foreground image before the display of the condition presentation image is started.

In step S3, when the condition identification unit 102 identifies that all of the automated driving conditions classified into multiple types are satisfied (YES in S3), the process proceeds to step S5. On the other hand, when the condition identification unit 102 identifies that at least one of the automated driving conditions classified into multiple types is not satisfied (NO in S3), the process proceeds to step S4.

Note that, when the determination in S3 is NO, the display control unit 104 may display an image indicating that the automated driving at level 3 cannot be performed together with the condition presentation image. As an example, a text image such as "LV3 not permitted" may be displayed. When the determination in S3 is NO, and when receiving an input by operating the automated driving SW 93, the display control unit 104 displays, for the automated driving condition that is not satisfied, an image indicating that the automated driving condition is not satisfied. In other words, the reason why the automated driving at level 3 cannot be performed may be displayed. In this case, it is preferable to facilitate the driver to recognize the reason why the automated driving at level 3 cannot be performed by not displaying the image indicating that the automated driving conditions are satisfied. When there is a change in the automated driving condition identified by the condition identification unit 102 as satisfying the condition while the condition presentation image is being displayed, the display control unit 104 changes the display of the condition presentation image according to this change.

In step S4, when it is a timing to end the condition presentation image display related process (YES in S4), the condition presentation image display related process is ended. On the other hand, when it is not the timing to end the condition presentation image display related process (NO in S4), the process returns to S3 and repeats the process. An example of the timing to end the condition presentation image display related process includes turning off of the power switch, turning off of the function of the display of the condition presentation image, and the like.

In step S5, the display control unit 104 displays an image indicating that the automated driving at level 3 can be performed. As an example, a text image such as "LV3 permitted" may be displayed. In this case, for the automated driving condition that satisfies the condition, an image indicating that the automated driving condition is satisfied may be displayed or may not be displayed. In other words, the reason why the automated driving at level 3 cannot be performed may be displayed or may not be displayed.

In step S6, when the vehicle has started the automated driving at level 3 (YES in S6), the process proceeds to step S8. On the other hand, when the vehicle has not started the automated driving at level 3 (NO in S6), the process proceeds to step S7. In step S7, when it is a timing to end the condition presentation image display related process (YES in S7), the condition presentation image display related process is ended. On the other hand, when it is not the timing to end the condition presentation image display related process (NO in S7), the process returns to S6 and repeats the process.

In addition, when it becomes possible to perform the automated driving at level 3, the automated driving ECU 80 may autonomously shift the subject vehicle to the automated driving at level 3 or may shift the subject vehicle to the automated driving at level 3 according to permission of the driver. When the configuration to shift the subject vehicle to the automated driving at level 3 according to the permission of the driver is adopted, the display control unit 104 may display an image for confirming whether the automated driving at level 3 is to be performed. As an example, a text image such as "Perform LV3?" may be displayed. Then, in response to this display, for example, when an input by operating the automated driving SW 93 is received, the automated driving ECU 80 may be configured to shift the subject vehicle to the automated driving at level 3.

In step S8, the display control unit 104 ends the display of the condition presentation image on the display device 91. The display control unit 104 may also end the display of the foreground image, for example. In this case, the display control unit 104 may cause the display device 91 to display an image explaining an action permitted as a second task, an image showing the vehicle speed of the subject vehicle, and the like.

In step S9, when the takeover request acquisition unit 103 acquires the driving takeover request (YES in S9), the process proceeds to step S11. On the other hand, when the takeover request acquisition unit 103 has not acquired the driving takeover request (NO in S9), the process proceeds to step S10. In step S10, when it is a timing to end the condition presentation image display related process (YES in S10), the condition presentation image display related process is ended. On the other hand, when it is not the timing to end the condition presentation image display related process (NO in S10), the process returns to S9 and repeats the process.

In step S8, the display control unit 104 displays the condition presentation image on the display device 91. As an example, the display control unit 104 displays, for the automated driving condition that is not satisfied, an image indicating that the automated driving condition is not satisfied. In other words, the reason why the automated driving at level 3 cannot be performed is displayed. In other words, the reason for takeover of driving is displayed. The condition presentation image is displayed together with the foreground image.

In step S12, when the subject vehicle ends the automated driving at level 3 and takeover of driving is performed (YES in S12), the process proceeds to step S13. On the other hand, when the subject vehicle has not finished the automated driving at level 3 and takeover of driving has not been performed (NO in S12), the process returns to S11 and repeats the process. The takeover of driving may be performed when an input by operating the automated driving SW 93 is received. Alternatively, takeover of driving may be performed when a gripping sensor in the vehicle state sensor 50 detects grip of the steering wheel. In addition, when takeover of driving cannot be performed even when the subject vehicle is in a state where the automated driving at level 3 cannot be continued, for example, the automated driving ECU 80 may be configured to automatically stop the vehicle on a road shoulder or the like.

In step S13, when it is a timing to end the condition presentation image display related process (YES in S13), the condition presentation image display related process is ended. On the other hand, when it is not the timing to end the condition presentation image display related process (NO in S13), the process returns to S1 and repeats the process.

Subsequently, an example of a flow of the condition presentation image display related process when the display of the condition presentation image is started on an operation of the automated driving SW 93 as a trigger will be described below with reference to FIG. 11. The condition for starting the flowchart of FIG. 11 may be the same as those of the flowchart of FIG. 10.

First, in step S21, when an input by operating the automated driving SW 93 is received (YES in S21), the process proceeds to step S22. On the other hand, when an input by operating the automated driving SW 93 has not been received (NO in S21), the process proceeds to step S33.

The process from steps S22 to S30 may be the same as the process from S2 to S10. In step S31, the display control unit 104 displays the condition presentation image on the display device 91. As an example, the display control unit 104 displays, for the automated driving condition that is not satisfied, an image indicating that the automated driving condition is not satisfied. In other words, the reason why the automated driving at level 3 cannot be performed is displayed. In other words, the reason for takeover of driving is displayed. The condition presentation image is displayed together with the foreground image. In S31, unlike the start of the automated driving at level 3, the display control unit 104 may be configured to display the condition presentation image even when an input by operating the automated driving SW 93 is not received.

In S31, similarly to the start of the automated driving at level 3, the display control unit 104 may be configured to display the condition presentation image when an input by operating the automated driving SW 93 is received. In this case, the takeover of driving may be performed when an input by operating the automated driving SW 93 is received again. Takeover of driving may be performed when the gripping sensor in the vehicle state sensor 50 detects grip of the steering wheel.

The process from steps S32 to S33 may be the same as the process from S12 to S13.

<Summary of First Embodiment>

According to the configuration of the first embodiment, the display device 91 is enabled to display the condition presentation image that is at least one of the image showing that the vehicle satisfies the automated driving condition and the image showing that the vehicle does not satisfy the automated driving condition, depending on the identification result of whether or not the automated driving condition identified for conditions classified into multiple types is satisfied. Therefore, by looking at the condition presentation image displayed on the display device 91, the driver is capable of easily recognizing whether or not the vehicle satisfies the conditions for performing the automated driving.

It is considered useful to present to the driver in an easy-to-understand manner why the automated driving is possible and why the automated driving is not possible, depending on whether the vehicle is capable of performing the automated driving. With respect to this, according to the configuration of the first embodiment, the condition presentation image is displayed for each of the conditions classified into multiple types. Therefore, it becomes easier for the driver to recognize why the automated driving can be performed and why the automated driving cannot be performed. Consequently, this configuration enables to present information to the driver such that the driver is facilitated to easily understand whether or not the subject vehicle is capable of performing the automated driving.

Further, according to the configuration of the first embodiment, as the condition presentation image, a change in display of a portion of the foreground image, which shows the foreground of the subject vehicle, that corresponds to the automated driving condition is displayed. Therefore, the driver is enabled to intuitively recognize why the automated driving can be performed and why the automated driving cannot be performed. Therefore, this configuration enables to present information to the driver such that the driver is facilitated to easily understand whether or not the subject vehicle is capable of performing the automated driving.

(Second Embodiment)

In the first embodiment, the case where the condition presentation image about the automated driving condition for the automated driving at level 3 is displayed has been explained as an example. However, it is not necessarily limited to this. For example, a configuration may be adopted in which a condition presentation image of the automated driving condition for the automated driving at level 2 or lower is displayed. As an example, the configuration may be applied when switching between the automated driving at level 2 and the automated driving at level 1 or the manual driving. In addition, the configuration may be applied when switching between the automated driving at level 1 and the manual driving. For example, the first automated driving ECU 81 may determine whether the automated driving at level 1 or 2 can be performed. For example, for the automated driving at level 3 or lower, the automated driving conditions may increase as the automation level increases.

Further, a configuration may be adopted in which a condition presentation image of the automated driving condition for the automated driving at level 4 or higher is displayed. Further, the automated driving condition may be changed as the automation level of the subject vehicle increases or decreases, and the condition presentation image that can be displayed may also be changed according to the change in the automated driving condition.

(Third Embodiment)

In the above embodiment, a configuration has been described in which, as the condition presentation image, a change in display of a portion of the foreground image that corresponds to the automated driving condition is displayed. However, it is not necessarily limited to this. For example, as the condition presentation image, images of icons (hereinafter, icon image) classified into multiple types for the automated driving conditions may be displayed side by side (hereinafter, third embodiment). Hereinafter, an example of the third embodiment will be described with reference to the drawings. The vehicle system 1 of the third embodiment is similar to the vehicle system 1 of the first embodiment, except for including an HCU 10a instead of the HCU 10.

<Schematic Configuration of HCU 10a>

Figure 12:
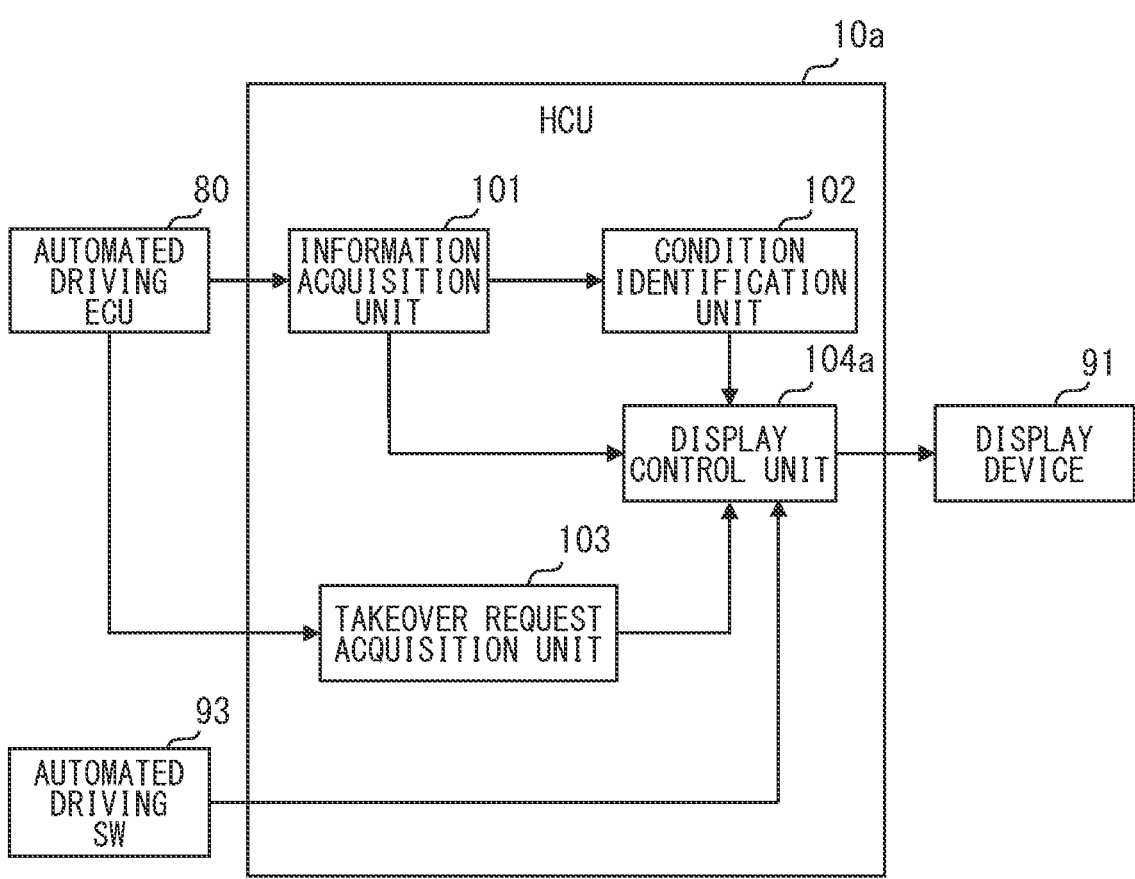
FIG. 12 is a diagram showing an example of a configuration of the HCU.

Herein, a schematic configuration of the HCU 10 will be described with reference to FIG. 12. As shown in FIG. 12, the HCU 10*a* includes, as functional blocks, an information acquisition unit 101, a condition identification unit 102, a takeover request acquisition unit 103, and a display control unit 104*a*. The HCU 10*a* is similar to the HCU 10 of the first embodiment except that the display control unit 104*a* is provided instead of the display control unit 104 of the first embodiment. The HCU 10*a* corresponds to the vehicle display control device. Execution of a process of each functional block of the HCU 10*a* by the computer corresponds to execution of a vehicle display control method.

The display control unit 104*a* is similar to the display control unit 104 of the first embodiment, except that the display control unit 104*a* displays, as the condition presentation image, icon images for the automated driving conditions classified into multiple types side by side, instead of displaying, as the condition presentation image, a change in display of a portion of the foreground image that corresponds to the automated driving condition. Processing by the display control unit 104*a* corresponds to a display control process.

Herein, with reference to FIGS. 13 to 16, an example of display of the icon images for the automated driving conditions classified into multiple types side by side, as the condition presentation image, will be described. In the present embodiment, the case where the condition presentation image about the automated driving condition for the automated driving at level 3 is displayed is explained as an example. Herein, an example of a case where a condition about a state of the driver is also used as the automated driving condition, in addition to, as the automated driving conditions, the separation structure condition, the vehicle speed condition, the lane number condition, and the other vehicle condition described in the first embodiment, will be described. The condition about the state of the driver (hereinafter referred to as a driver state condition) has been described in the first embodiment. The driver state condition is that the driver is not in a state in which the driver is impossible to takeover the driving.

In order to prevent display of multiple icon images from becoming complicated for the driver, the display control unit 104*a* preferably groups multiple automated driving conditions into a higher automated driving condition. Further, the icon images for the grouped automated driving conditions may be displayed side by side. The icon images may be displayed side by side in a horizontal direction or may be displayed in a vertical direction. As an example, the separation structure condition and the lane number condition may be grouped into the lane condition. Herein, the vehicle speed condition, the other vehicle state condition, and the driver state condition are explained as forming a group independently.

Figure 13:
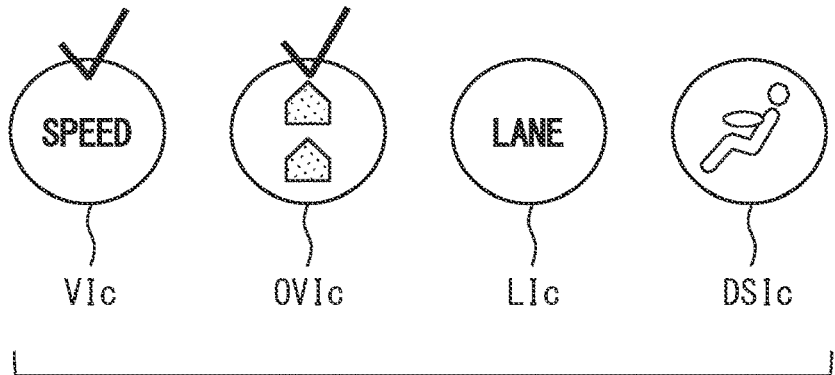
FIG. 13 is a diagram for explaining an example of display of a condition presentation image.

As shown in FIG. 13, the display control unit 104*a* displays the icon images for the vehicle speed condition, the other vehicle state condition, the lane condition, and the driver condition, at a timing to display the condition presentation image. Note that the timing of starting and ending the display of the condition presentation image may be the same as described in the first embodiment. VIc in FIG. 13 shows the icon image of the vehicle speed condition. OVIc in FIG. 13 shows the icon image of the other vehicle condition. LIc in FIG. 13 shows the icon image of the lane condition. DSIc in FIG. 13 shows the icon image of the driver state condition.

As shown in FIG. 13, the icon image indicating that the condition is satisfied may be an image with a check mark.

On the other hand, the icon image indicating that the condition is not satisfied may be an image without the check mark. Note that whether or not the condition is satisfied may be indicated by changing another display mode such as changing a brightness of the image or changing a color of the image.

Figure 14:
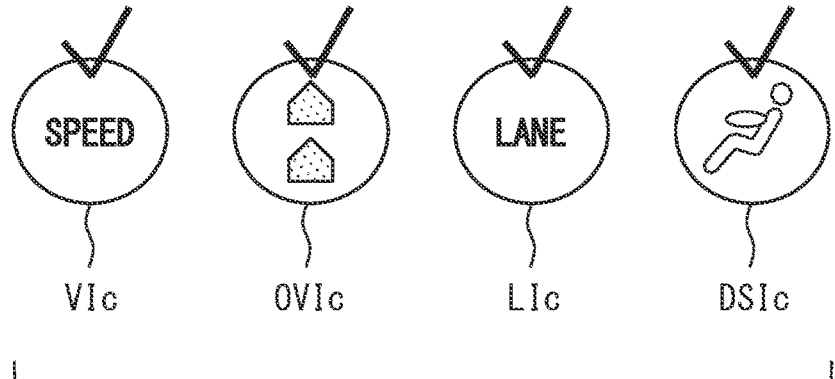
FIG. 14 is a diagram for explaining an example of display of a condition presentation image.
Figure 15:
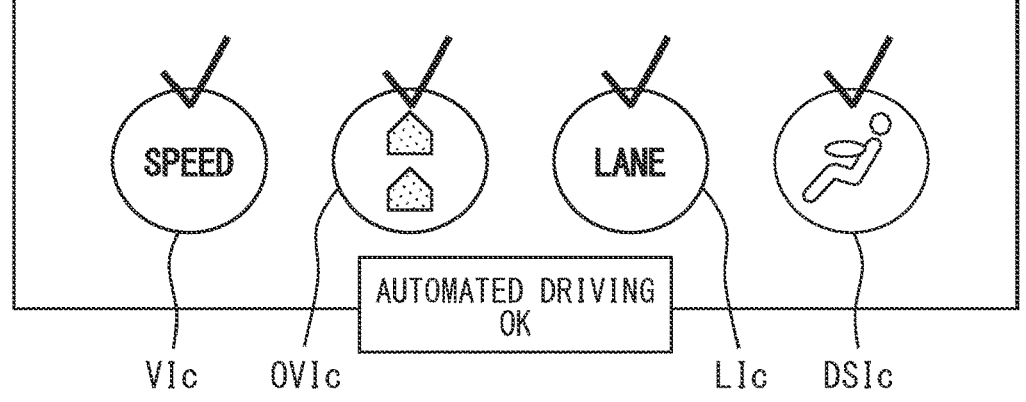
FIG. 15 is a diagram for explaining an example of display of a condition presentation image.

As shown in FIG. 14, the display control unit 104*a* may display an image indicating that the automated driving can be performed when all the icon images becomes icon images indicating that the conditions are satisfied. As an example, as shown in FIG. 15, a text image such as "automated driving OK" may be displayed.

Figure 16:
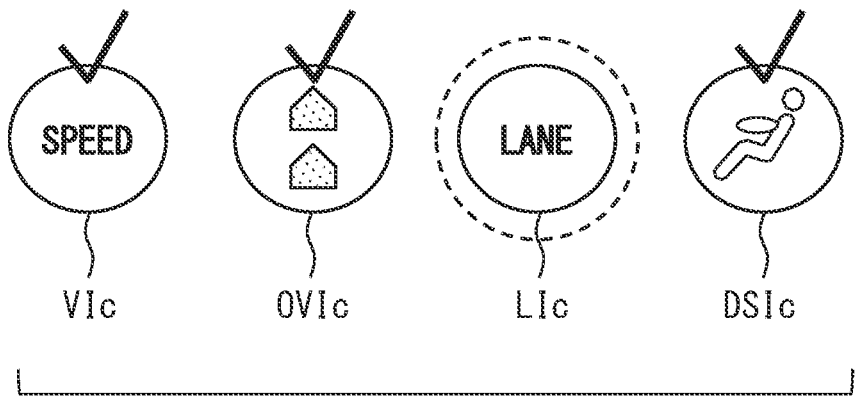
FIG. 16 is a diagram for explaining an example of display of a condition presentation image.

As for the automated driving condition that does not satisfy the condition, as shown by an image the LIc icon image in FIG. 16 surrounded by a dashed circle, the display control unit 104*a* may display the icon image indicating that the condition is not satisfied. Note that, as shown in FIG. 16, the display control unit 104*a* may display the icon image indicating that the condition is satisfied and the icon image indicating that the condition is not satisfied as a mixture. The display control unit 104*a* may display only one of the icon image indicating that the condition is satisfied and the icon image indicating that the condition is not satisfied.

When a state in which the vehicle satisfies the condition for performing the automated driving at level 3 transitions to or has transitioned to a state in which the condition for performing the automated driving at level 3 is not satisfied, about the automated driving condition that has caused transition to the state where the condition for performing the automated driving at level 3 is not satisfied, the display control unit 104*a* is preferably configured to display an icon image indicating that the vehicle does not satisfy the condition for the automated driving at level 3. This facilitates the driver to recognize the cause why the condition for performing the automated driving is not satisfied. Note that the display of the icon image indicating that the vehicle does not satisfy the condition for performing the automated driving at level 3 may be maintained for a certain time period immediately after the release the automated driving at level 3, and then the indication may be terminated. The predetermined time period may be a time period that can be set appropriately. In this case, as the icon image, as indicated by LIc in FIG. 13, the icon image without highlighting may be displayed.

As shown by the image the LIc icon image in FIG. 16 surrounded by the dashed circle, the icon image indicating that the condition is not satisfied may be, as an example, highlighted differently from that when the condition is satisfied. Other examples may include a configuration in which the icon image itself blinks, the outer periphery of the icon image is illuminated, or the outer periphery of the icon image blinks.

When a state in which the subject vehicle does not satisfies the condition for performing the automated driving at level 3 transitions to a state in which the condition for performing the automated driving at level 3 is satisfied, the display control unit 104*a* displays an icon image indicating that the vehicle satisfies the condition for the automated driving at level 3 and does not display the icon image indicating that the condition is not satisfied. With respect to this, when a state in which the subject vehicle satisfies the condition for performing the automated driving at level 3 transitions to or has transitioned to a state in which the condition for performing the automated driving at level 3 is not satisfied, the display control unit 104*a* may display the icon image indicating that the condition is not satisfied. According to this, by providing a unique display when the automated driving is released, it becomes easier for the driver to recognize the cause why the condition for performing the automated driving is not satisfied.

The display control unit 104a may display the icon image on the display device 91 different from the display device 91 that displays the foreground image. Note that the icon image may be superimposed on the foreground image and displayed on the display device 91 that displays the foreground image. Further, the icon image may be displayed in a separate display area from the foreground image on the display device 91 that displays the foreground image.

Note that the grouping of the multiple automated driving conditions may be changeable in accordance with an input received from the user through the user input device 92 for selecting a combination of the automated driving conditions to be grouped. As for the icon images, icon images for each combination of the automated driving conditions that can be grouped may be stored in advance in a non-volatile memory of the HCU 10a thereby usable by the display control unit 104a.

Herein, the case where the condition presentation image about the automated driving condition for the automated driving at level 3 is displayed has been explained as an example. However, it is not necessarily limited to this. As described in the second embodiment, Further, a configuration may be adopted in which a condition presentation image of the automated driving condition for the automated driving other than level 3 is displayed.

Further, the automated driving condition may be changed as the automation level of the subject vehicle increases or decreases, and the condition presentation image that can be displayed may also be changed according to the change in the automated driving condition. For example, when entering the ST section, when a specific condition such as traffic congestion is satisfied, or when there is a request to switch from level 3 to the automated driving at level 2 or lower or the manual driving, the automated driving condition for the automated driving at level 3 may be displayed. On the other hand, when entering a non-ST section, or when it is necessary to switch from level 2 to the automated driving at level 1 or the manual driving, the condition presentation image of the automated driving condition for the automated driving at level 2 may be displayed.

Figure 17:
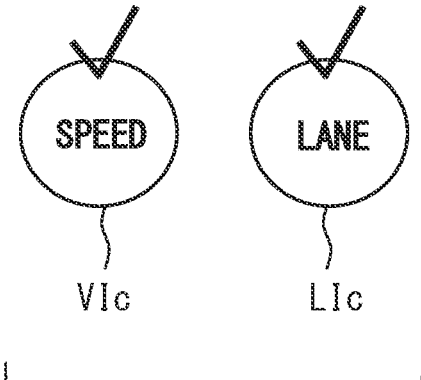
FIG. 17 is a diagram for explaining an example of display of a condition presentation image.

When the condition presentation image of the automated driving condition for the automated driving at level 2 is displayed, as shown in FIG. 17, the combination of the icon image may be differentiated from the condition presentation image of the automated driving condition for the automated driving at level 3. When the number of the automated driving conditions changes as the automation level of the automated driving of the vehicle increases or decreases, the number of the icon images may be changed according to the change in the number of the automated driving conditions. The example of FIG. 17 includes the icon images for the vehicle speed condition and the lane condition, but does not include the icon images for the other vehicle condition and the driver state condition.

<Summary of Third Embodiment>

In addition, according to the third embodiment, by looking at the condition presentation image displayed on the display device 91, the driver is capable of easily recognizing whether or not the vehicle satisfies the conditions for performing the automated driving. In addition, the condition presentation image is displayed for each of the conditions classified into multiple types. Therefore, this configuration enables to present information to the driver such that the driver is facilitated to easily understand whether or not the subject vehicle is capable of performing the automated driving. Further, according to the configuration of the third embodiment, the icon images that indicate at least one of whether or not the conditions are satisfied respectively for the automated driving conditions are displayed side by side. Therefore, the driver is enabled to easily recognize why the automated driving can be performed and why the automated driving cannot be performed. Therefore, this configuration enables to present information to the driver such that the driver is facilitated to easily understand whether or not the subject vehicle is capable of performing the automated driving.

(Fourth Embodiment)

For example, a configuration may be adopted in which the automated driving conditions classified into multiple types are arranged side by side as items and an image of a graph (hereinafter referred to as a graph image) indicating a degree by which each condition is satisfied is displayed as a condition presentation image (hereinafter referred to as a fourth embodiment). Hereinafter, an example of the fourth embodiment will be described with reference to the drawings. The vehicle system 1 of the fourth embodiment is similar to the vehicle system 1 of the first embodiment, except for including an HCU 10b instead of the HCU 10.

<Schematic Configuration of HCU 10b>

Figure 18:
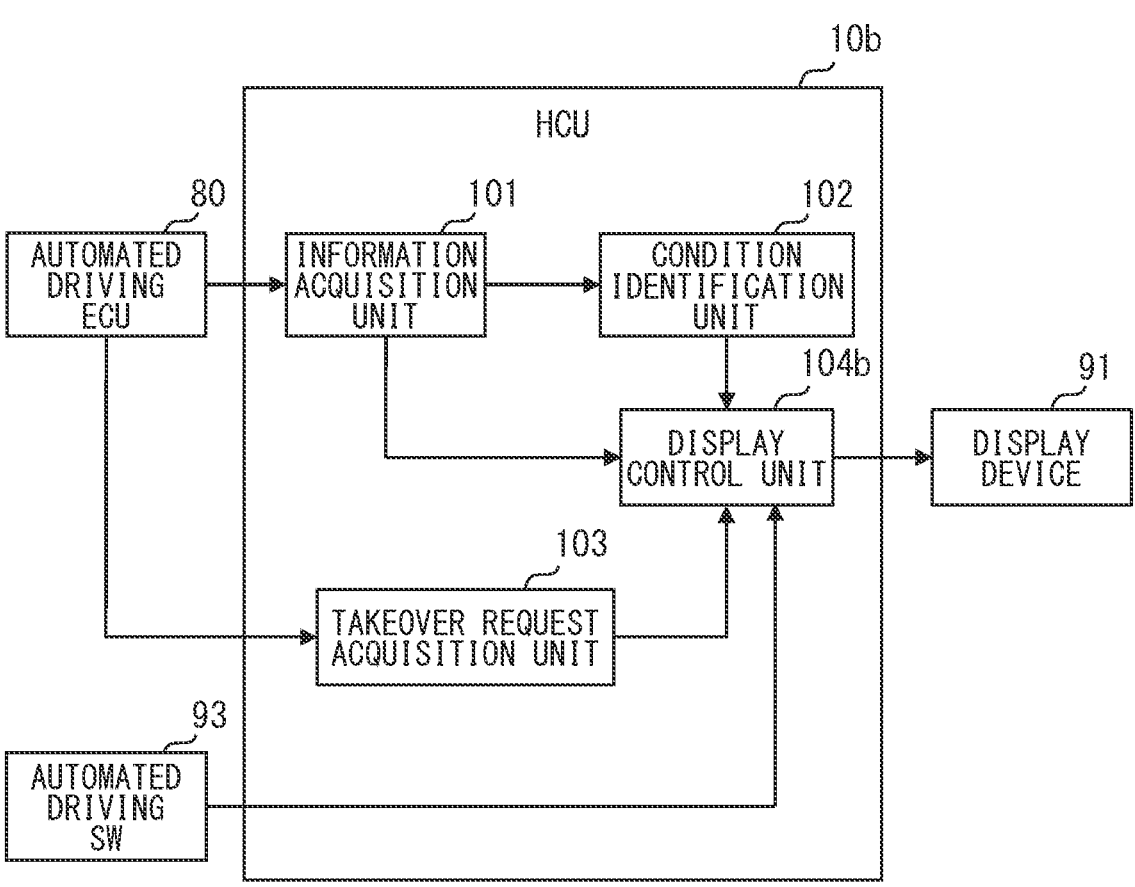
FIG. 18 is a diagram showing an example of a configuration of an HCU.

Herein, a schematic configuration of the HCU 10b will be described with reference to FIG. 18. As shown in FIG. 18, the HCU 10b includes, as functional blocks, an information acquisition unit 101, a condition identification unit 102, a takeover request acquisition unit 103, and a display control unit 104b. The HCU 10b is similar to the HCU 10 of the first embodiment except that the display control unit 104b is provided instead of the display control unit 104 of the first embodiment. The HCU 10b corresponds to the vehicle display control device. Execution of a process of each functional block of the HCU 10b by the computer corresponds to execution of a vehicle display control method.

The display control unit 104b is similar to the display control unit 104 of the first embodiment, except that a graph image, in which the automated driving conditions classified into multiple types as items are arranged side by side and showing the degree by which each condition is satisfied, is displayed as the condition presentation image, instead of displaying, as the condition presentation image, a change in display of a portion of the foreground image that corresponds to the automated driving condition. Processing by the display control unit 104b corresponds to a display control process.

The display control unit 104b preferably displays in the graph image the degree by which the automated driving condition is satisfied for each of the automated driving conditions classified into multiple types. In this case, the information acquisition unit 101 may be configured to acquire information that enables to identify the degree by which the automated driving condition is satisfied. Further, the display control unit 104b may identify the degree by which the automated driving condition is satisfied from this information, and may display the degree by which the automated driving condition is satisfied. An example of information that enables to identify the degree by which the automated driving condition is satisfied is information used by the automated driving ECU 80 to determine whether the automated driving condition is satisfied. In addition, in a configuration in which the automated driving ECU 80 identifies the degree by which the automated driving condition is satisfied, information on the degree by which the automated driving condition is satisfied may be included.

Herein, with reference to FIG. 19, an example of the graph image, as the condition presentation image, in which the automated driving conditions classified into multiple types as items are arranged side by side and showing the degree by which each condition is satisfied will be described. In the present embodiment, the case where the condition presentation image about the automated driving condition for the automated driving at level 3 is displayed is explained as an example. Herein, an example of a case where a condition about the state of the driver described in the third embodiment is also used as the automated driving condition, in addition to, as the automated driving conditions, the separation structure condition, the vehicle speed condition, the lane number condition, and the other vehicle condition described in the first embodiment, will be described.

In order to prevent display of the graph image from becoming complicated for the driver, the display control unit 104*b* preferably groups the multiple automated driving conditions as items of the graph image into higher automated driving conditions. Further, the items for the grouped automated driving conditions may be displayed side by side. The items may be displayed side by side in the horizontal direction or may be displayed in the vertical direction. As an example, the separation structure condition and the lane number condition may be grouped into the lane condition. Herein, the vehicle speed condition, the other vehicle state condition, and the driver state condition are explained as forming a group independently.

Figure 19:
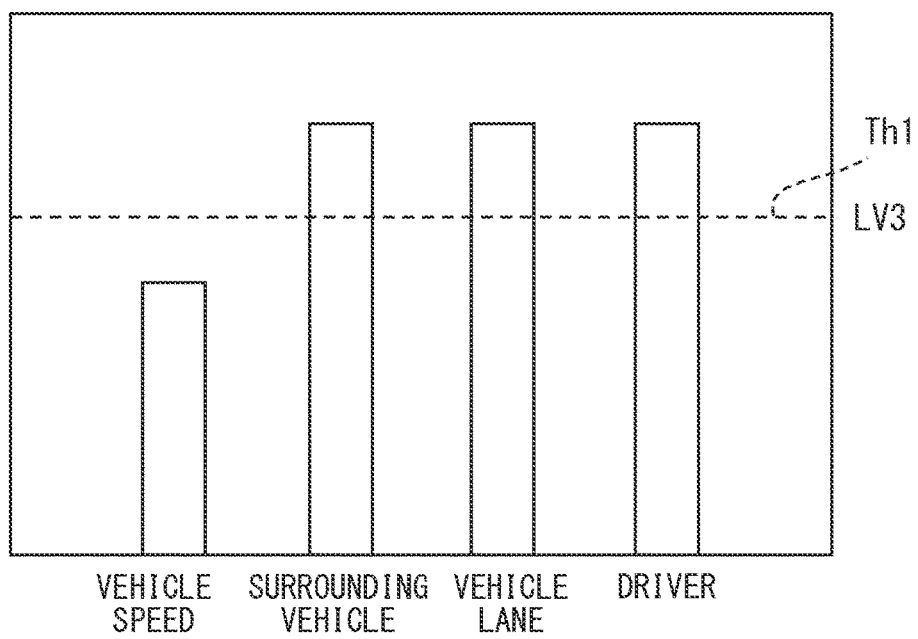
FIG. 19 is a diagram for explaining an example of display of a condition presentation image.

As shown in FIG. 19, the display control unit 104*b* may display an image of bar graphs each showing the degree by which each condition is satisfied for the vehicle speed condition, the other vehicle state condition, the lane condition, and the driver state condition arranged side by side as items at a timing to display the condition presentation image. Note that the timing of starting and ending the display of the condition presentation image may be the same as described in the first embodiment. "Vehicle speed" in FIG. 13 shows the item of the vehicle speed condition. "Surrounding vehicle" in FIG. 19 shows the item of the other vehicle condition. "Lane" in FIG. 19 shows the item of the lane condition. "Driver" in FIG. 19 shows the driver state condition. Further, Th1 in FIG. 19 shows a line representing a threshold for performing the automated driving at level 3.

As shown in FIG. 19, the display control unit 104*b* displays bar of the bar graph by a length according to the degree, by which the automated driving condition identified for each of the automated driving conditions is satisfied, to enable comparison with the threshold for performing the automated driving. In this way, the configuration enables the driver to recognize the degree by which the automated driving conditions are satisfied from a degree of difference between the threshold at which the automated driving can be performed and a tip position of the bar in the bar graph. Thus, the display control unit 104*b* displays, in the graph image, the degree by which the automated driving condition is satisfied for each of the automated driving conditions classified into multiple types. When the tip position of the bar of the bar graph corresponding to the automated driving condition does not reach the threshold, it shows that the automated driving condition is not satisfied and the degree of lack of the automated driving condition. Alternatively, when the tip position of the bar of the bar graph corresponding to the automated driving condition exceeds the threshold, it shows that the automated driving condition is satisfied and the degree of allowance of the automated driving condition.

The display control unit 104*b* may display the graph image on the display device 91 different from the display device 91 that displays the foreground image. Note that the graph image may be superimposed on the foreground image and displayed on the display device 91 that displays the foreground image. Further, the graph image may be displayed in a separate display area from the foreground image on the display device 91 that displays the foreground image.

Note that the grouping of the multiple automated driving conditions may be changeable in accordance with an input received from the user through the user input device 92 for selecting a combination of the automated driving conditions to be grouped. As for the items for the automated driving conditions in the graph image, items for each combination of the automated driving conditions that can be grouped may be stored in advance in a non-volatile memory of the HCU 10*b* thereby usable by the display control unit 104*b*.

Herein, the case where the condition presentation image about the automated driving condition for the automated driving at level 3 is displayed has been explained as an example. However, it is not necessarily limited to this. As described in the second embodiment, Further, a configuration may be adopted in which a condition presentation image of the automated driving condition for the automated driving other than level 3 is displayed. As described in the second embodiment, further, the automated driving condition may be changed as the automation level of the subject vehicle increases or decreases, and the condition presentation image that can be displayed may also be changed according to the change in the automated driving condition.

Figure 20:
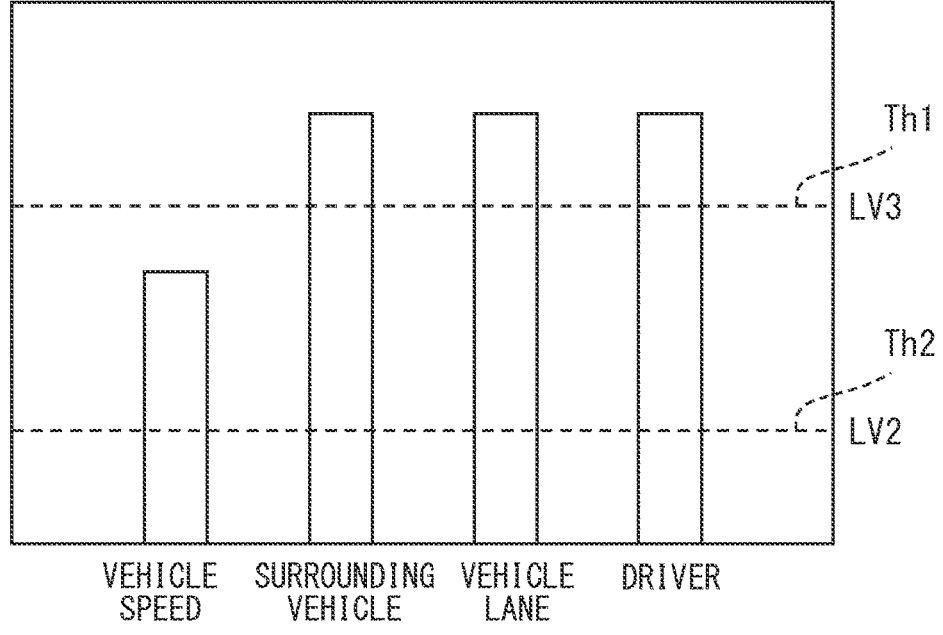
FIG. 20 is a diagram for explaining an example of display of a condition presentation image.

In addition, the display control unit 104*b* may be configured to collectively display the condition presentation images for the automated driving conditions for the automated driving at multiple stages of automation levels. As shown in FIG. 20, as an example, the display control unit 104*b* may display lines each representing a threshold at which the automated driving can be performed for each of the automation levels in the image of the bar graph showing the degree by which the automated driving condition is satisfied. In FIG. 20, as an example, a case where a line representing a threshold for performing the automated driving at level 2 and a line representing a threshold for performing the automated driving at level 3 are displayed will be described. Th2 in FIG. 20 shows a line representing a threshold for performing the automated driving at level 2. According to this, using the same graph image, both the degree by which the automated driving condition for the automated driving at level 2 is satisfied and an extent by which the automated driving condition for the automated driving at level 3 is satisfied are simultaneously displayed to the driver.

<Summary of Fourth Embodiment>

In addition, according to the fourth embodiment, by looking at the condition presentation image displayed on the display device 91, the driver is capable of easily recognizing whether or not the vehicle satisfies the conditions for performing the automated driving. In addition, the condition presentation image is displayed for each of the conditions classified into multiple types. Therefore, this configuration enables to present information to the driver such that the driver is facilitated to easily understand whether or not the subject vehicle is capable of performing the automated driving. Furthermore, according to the configuration of the fourth embodiment, the image of the graph showing the degree by which the automated driving condition is satisfied is displayed by arranging the items side by side for the automated driving conditions. Therefore, the driver is enabled to easily recognize why the automated driving can be performed and why the automated driving cannot be performed. Therefore, this configuration enables to present information to the driver such that the driver is facilitated to easily understand whether or not the subject vehicle is capable of performing the automated driving.

In the fourth embodiment, the configuration using the bar graph has been described as an example. However, it is not necessarily limited to this. A graph other than the bar graph may be used as long as the graph enables to indicate the degree by which the automated driving condition is satisfied.

(Fifth Embodiment)

The third and fourth embodiments show an example of a configuration in which the condition presentation images for the automated driving conditions classified into multiple types are displayed side by side. However, it is not necessarily limited to this. In a display mode other than that shown in the third and fourth embodiments, the condition presentation images may be arranged side by side and displayed for the automated driving conditions classified into multiple types. According to the configuration in which the condition presentation images are displayed side by side for the automated driving conditions classified into multiple types, by displaying the condition presentation images for the automated driving conditions side by side, the driver is enabled to more easily recognize why the automated driving can be performed and why the automated driving cannot be performed.

(Sixth Embodiment)

The above embodiments show an example of a configuration in which the condition presentation images for the automated driving conditions classified into multiple types are displayed side by side. However, it is not necessarily limited to this. For example, a configuration may be adopted that displays whether all of the automated driving conditions classified into multiple types of the automated driving at level 3 or higher are satisfied, or whether even one of these automated driving conditions is not satisfied. This display may be made separately from the display indicating whether the automated driving at level 3 or higher can be performed. For example, separately from the text image of "LV3 not permitted", a text image such as "automated driving condition not sufficient" may be displayed.

In addition, according to the above configuration, by looking at the condition presentation image displayed on the display device 91, the driver is capable of easily recognizing whether or not the vehicle satisfies the conditions for performing the automated driving. Consequently, this configuration enables to present information to the driver such that the driver is facilitated to easily understand whether or not the subject vehicle is capable of performing the automated driving.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. The controller and the method thereof described in the present disclosure may be implemented by a special purpose computer which includes a processor programmed to execute one or more functions executed by a computer program. Alternatively, the device and the method thereof described in the present disclosure may be implemented by a special purpose hardware logic circuit. Alternatively, the device and the method thereof described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

What is claimed is:

1. A vehicle display control device to be used in a vehicle, the vehicle configured to perform automated driving in which a vehicle-side system is capable of performing all driving tasks, the vehicle display control device comprising a processor and memory configured to:

identify whether a condition for performing the automated driving is satisfied for each of a plurality of conditions classified into a plurality of types;

in a state in which the vehicle does not perform the automated driving, cause a display device, which is to be used in an interior of the vehicle, to display a condition presentation image, which is an image indicating that the vehicle satisfies the condition for performing the automated driving, according to an identification result;

start display of the condition presentation image in response to a determination that the vehicle does not perform the automated driving and that an input receiving device, which is configured to receive input from a user of the vehicle, receives an input that requests start of the automated driving; and end display of the condition presentation image in response to a determination that the condition for performing the automated driving is satisfied for each of the plurality of conditions classified into the plurality of types and that the automated driving is started.

2. The vehicle display control device according to claim 1, wherein the processor and memory are further configured to:

cause to display the condition presentation image of each of the plurality of conditions.

3. The vehicle display control device according to claim 2, wherein the processor and memory are further configured to:

cause to display the condition presentation image side by side for each of the plurality of conditions classified into the plurality of types.

4. The vehicle display control device according to claim 3, wherein the processor and memory are further configured to:

cause to display, as the condition presentation image, an image of an icon side by side for each of the plurality of conditions classified into the plurality of types.

5. The vehicle display control device according to claim 4, wherein the processor and memory are further configured to:

when a state, in which the vehicle satisfies the condition for performing the automated driving, transitions to or has transitioned to a state, in which the vehicle does not satisfy the condition for performing the automated driving, display, as the condition presentation image, the image of an icon indicating that the vehicle does not satisfy the condition for the automated driving about a condition that has caused transition to the state where the vehicle does not satisfy the condition for performing the automated driving.

6. The vehicle display control device according to claim 3, wherein the processor and memory are further configured to:

display, as the condition presentation image, an image of a graph, which indicates a degree by which each of the plurality of conditions is satisfied and arranged side by side as items about the plurality of conditions classified into the plurality of types.

7. The vehicle display control device according to claim 6, wherein the processor and memory are further configured to:

display, in the image of a graph, the degree by which each of the plurality of conditions is satisfied about the plurality of conditions classified into the plurality of types.

8. The vehicle display control device according to claim 1, wherein the processor and memory are further configured to:

cause the display device to display a foreground image that is an image showing a foreground of the vehicle, and display, as the condition presentation image, a change in display of a portion of the foreground image that corresponds to the condition.

9. The vehicle display control device according to claim 1, wherein the processor and memory are further configured to:

start display of the condition presentation image in at least one of a state, in which the vehicle does not perform the automated driving, or a state, in which the vehicle ends the automated driving.

10. The vehicle display control device according to claim 9, wherein the processor and memory are further configured to:

cause to display the condition presentation image for each of the plurality of conditions classified into the plurality of types; and start display of the condition presentation image, when a specific condition among the plurality of conditions classified into the plurality of types is satisfied.

11. The vehicle display control device according to claim 9, wherein the processor and memory are further configured to:

cause to display the condition presentation image for each of the plurality of conditions classified into the plurality of types, and start display of the condition presentation image when a location, which satisfies a specific condition among the plurality of conditions classified into the plurality of types, is predictable and when the vehicle is within a predetermined distance or within a predetermined time to the location.

12. The vehicle display control device according to claim 9, wherein the processor and memory are further configured to:

end display of the condition presentation image, when the vehicle performs the automated driving after displaying the condition presentation image.

13. A vehicle display control system comprising:

the display device, which is to be used in the interior of the vehicle; and the vehicle display control device according to claim 1.

14. The vehicle display control device according to claim 1, wherein the plurality of conditions include: a first condition of whether a structure that separates lanes according to a direction of travel of the vehicle exists; a second condition of whether a speed of the vehicle is equal to or lower than at vehicle speed threshold at which automated driving can be performed; a third condition of whether a road on which the vehicle travels has a number of lanes that allows automated driving to be performed; and a fourth condition of whether a state of another vehicle in a vicinity of the vehicle allows automated driving.

15. A vehicle display control device to be used in a vehicle, the vehicle configured to perform automated driving in which a vehicle-side system is capable of performing all driving tasks, the vehicle display control device comprising a processor and memory configured to:

identify whether a condition for performing the automated driving is satisfied for each of a plurality of conditions classified into a plurality of types;

cause a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result;

start display of the condition presentation image on in response to a determination that the vehicle does not perform the automated driving and that an input receiving device, which is configured to receive input from a user of the vehicle, receives an input that requests start of the automated driving;

end display of the condition presentation image in response to a determination that the condition for performing the automated driving is satisfied for each of the plurality of conditions classified into the plurality of types and that the automated driving is started; and cause to display the condition presentation image of each of the plurality of conditions classified into the plurality of types.

16. A vehicle display control device to be used in a vehicle, the vehicle configured to perform automated driving in which a vehicle-side system performs at least a part of driving tasks, the vehicle display control device comprising a processor and memory configured to:

identify whether a condition for performing the automated driving is satisfied for each of a plurality of conditions classified into a plurality of types;

cause a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, for each of the plurality of conditions classified into the plurality of types, according to an identification result;

start display of the condition presentation image in response to a determination that the vehicle does not perform the automated driving and that an input receiving device, which is configured to receive input from a user of the vehicle, receives an input that requests start of the automated driving; and end display of the condition presentation image on in response to a determination that the condition for performing the automated driving is satisfied for each of the plurality of conditions classified into the plurality of types and that the automated driving is started.

17. A vehicle display control device to be used in a vehicle, the vehicle configured to perform automated driving in which a vehicle-side system is capable of performing all driving tasks, the vehicle display control device comprising a processor and memory configured to:

identify whether a condition for performing the automated driving is satisfied for each of a plurality of conditions classified into a plurality of types;

cause a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result;

cause the display device to display a foreground image that is an image showing a foreground of the vehicle;

display, as the condition presentation image, a change in display of a portion of the foreground image that corresponds to the condition;

start display of the condition presentation image in response to a determination that the vehicle does not perform the automated driving and that an input receiving device, which is configured to receive input from a user of the vehicle, receives an input that requests start of the automated driving; and end display of the condition presentation image in response to a determination that the condition for performing the automated driving is satisfied for each of the plurality of conditions classified into the plurality of types and that the automated driving is started.

18. A vehicle display control device to be used in a vehicle, the vehicle configured to perform automated driving in which a vehicle-side system is capable of performing all driving tasks, the vehicle display control device comprising a processor and memory configured to:

identify whether a condition for performing the automated driving is satisfied for each of conditions classified into a plurality of types;

cause a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result;

cause to display the condition presentation image for each of the plurality of conditions classified into the plurality of types;

start display of the condition presentation image, when a specific condition among the plurality of conditions classified into the plurality of types is satisfied, and in response to a determination that the vehicle does not perform the automated driving and that an input receiving device, which is configured to receive input from a user of the vehicle, receives an input that requests start of the automated driving; and end display of the condition presentation image in response to a determination that the condition for performing the automated driving is satisfied for each of the plurality of conditions classified into the plurality of types and that the automated driving is started.

19. A vehicle display control device to be used in a vehicle, the vehicle configured to perform automated driving in which a vehicle-side system is capable of performing all driving tasks, the vehicle display control device comprising a processor and memory configured to:

identify whether a condition for performing the automated driving is satisfied for each of a plurality of conditions classified into a plurality of types;

cause a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result;

display the condition presentation image for each of the plurality of conditions classified into the plurality of types;

start display of the condition presentation image when a location, which satisfies a specific condition among the plurality of conditions classified into the plurality of types, is predictable and when the vehicle is within a predetermined distance or within a predetermined time to the location and in response to a determination that the vehicle does not perform the automated driving and that an input receiving device, which is configured to receive input from a user of the vehicle, receives an input that requests start of the automated driving; and end display of the condition presentation image in response to a determination that the condition for performing the automated driving is satisfied for each of the plurality of conditions classified into the plurality of types and that the automated driving is started.

20. A vehicle display control method for a vehicle to be executed by at least one processor, the vehicle configured to perform automated driving in which a vehicle-side system is capable of performing all driving tasks, the vehicle display control method comprising:

identifying, in a condition identification process, whether a condition for performing the automated driving is satisfied for each of a plurality of conditions classified into a plurality of types;

causing, in a display control process and in a state in which the vehicle does not perform the automated driving, a display device, which is to be used in an interior of the vehicle, to display a condition presentation image, which is an image indicating that the vehicle satisfies the condition for performing the automated driving, according to an identification result of the condition identification process;

starting display of the condition presentation image in response to a determination that the vehicle does not perform the automated driving and that an input receiving device, which is configured to receive an input from a user of the vehicle, receives an input that requests start of the automated driving; and ending display of the condition presentation image in response to a determination that the condition for performing the automated driving is satisfied for each of the plurality of conditions classified into the plurality of types and that the automated driving is started.

21. A vehicle display control method for a vehicle to be executed by at least one processor, the vehicle configured to perform automated driving in which a vehicle-side system is capable of performing all driving tasks, the vehicle display control method comprising:

identifying, in a condition identification process, whether a condition for performing the automated driving is satisfied for each of a plurality of conditions classified into a plurality of types;

causing, in a display control process, a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result of the condition identification process;

starting display of the condition presentation image in response to a determination that the vehicle does not perform the automated driving and that an input receiving device, which is configured to receive input from a user of the vehicle, receives an input that requests start of the automated driving; and ending display of the condition presentation image in response to a determination that the condition for performing the automated driving is satisfied for each of the plurality of conditions classified into the plurality of types and that the automated driving is started, wherein the display control process includes causing to display the condition presentation image for each of the plurality of conditions classified into the plurality of types.

22. A vehicle display control method for a vehicle to be executed by at least one processor, the vehicle configured to perform automated driving in which a vehicle-side system is capable of performing all driving tasks, the vehicle display control method comprising:

identifying, in a condition identification process, whether a condition for performing the automated driving is satisfied for each of a plurality of conditions classified into a plurality of types;

causing, in a display control process, a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result of the condition identification process;

starting display of the condition presentation image in response to a determination that the vehicle does not perform the automated driving and that an input receiving device, which is configured to receive input from a user of the vehicle, receives an input that requests start of the automated driving; and ending display of the condition presentation image in response to a determination that the condition for performing the automated driving is satisfied for each of the conditions classified into the plurality of types and that the automated driving is started, wherein the display control process includes causing the display device to display a foreground image that is an image showing a foreground of the vehicle, and displaying, as the condition presentation image, a change in display of a portion of the foreground image that corresponds to the condition.

23. A vehicle display control method for a vehicle to be executed by at least one processor, the vehicle configured to perform automated driving in which a vehicle-side system is capable of performing all driving tasks, the vehicle display control method comprising:

identifying, in a condition identification process, whether a condition for performing the automated driving is satisfied for each of a plurality of conditions classified into a plurality of types;

causing, in a display control process, a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result of the condition identification process;

starting display of the condition presentation image in response to a determination that the vehicle does not perform the automated driving and that an input receiving device, which is configured to receive input from a user of the vehicle, receives an input that requests start of the automated driving; and ending display of the condition presentation image on determination that the condition for performing the automated driving is satisfied for each of the plurality of conditions classified into the plurality of types and that the automated driving is started, wherein the display control process includes causing to display the condition presentation image for each of the plurality of conditions classified into the plurality of types, and starting display of the condition presentation image, when a specific condition among the plurality of conditions classified into the plurality of types is satisfied.

24. A vehicle display control method for a vehicle to be executed by at least one processor, the vehicle configured to perform automated driving in which a vehicle-side system is capable of performing all driving tasks, the vehicle display control method comprising:

identifying, in a condition identification process, whether a condition for performing the automated driving is satisfied for each of a plurality of conditions classified into a plurality of types;

causing, in a display control process, a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, according to an identification result of the condition identification process;

starting display of the condition presentation image in response to a determination that the vehicle does not perform the automated driving and that an input receiving device, which is configured to receive an input from a user of the vehicle, receives an input that requests start of the automated driving; and ending display of the condition presentation image in response to a determination that the condition for performing the automated driving is satisfied for each of the plurality of conditions classified into the plurality of types and that the automated driving is started, wherein the display control process includes causing to display the condition presentation image for each of the plurality of conditions classified into the plurality of types, and starting display of the condition presentation image when a location, which satisfies a specific condition among the plurality of conditions classified into the plurality of types, is predictable and when the vehicle is within a predetermined distance or within a predetermined time to the location.

25. A vehicle display control method for a vehicle to be executed by at least one processor, the vehicle configured to perform automated driving in which a vehicle-side system is configured to perform at least a part of driving tasks, the vehicle display control method comprising:

identifying, in a condition identification process, whether a condition for performing the automated driving is satisfied for each of a plurality of conditions classified into a plurality of types;

causing, in a display control process, a display device, which is to be used in an interior of the vehicle, to display a condition presentation image that is at least one of an image, which indicates that the vehicle satisfies the condition for performing the automated driving, or an image, which indicates that the vehicle does not satisfy the condition for performing the automated driving, for each of the plurality of conditions classified into the plurality of types, according to an identification result of the condition identification process;

starting display of the condition presentation image in response to a determination that the vehicle does not perform the automated driving and that an input receiving device, which is configured to receive input from a user of the vehicle, receives an input that requests start of the automated driving; and ending display of the condition presentation image in response to a determination that the condition for performing the automated driving is satisfied for each of the plurality of conditions classified into the plurality of types and that the automated driving is started.

\* \* \* \* \*